US009038129B2

(12) United States Patent
Proctor, Jr. et al.

(10) Patent No.: US 9,038,129 B2
(45) Date of Patent: *May 19, 2015

(54) ENFORCING POLICIES IN WIRELESS COMMUNICATION USING EXCHANGED IDENTITIES

(71) Applicants: James Arthur Proctor, Jr., Melbourne Beach, FL (US); James Arthur Proctor, III, Indialantic, FL (US)

(72) Inventors: James Arthur Proctor, Jr., Melbourne Beach, FL (US); James Arthur Proctor, III, Indialantic, FL (US)

(73) Assignee: Proxicom Wireless, LLC, Indialantic, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/744,457

(22) Filed: Jan. 18, 2013

(65) Prior Publication Data
US 2013/0133087 A1    May 23, 2013

Related U.S. Application Data

(60) Division of application No. 13/015,306, filed on Jan. 27, 2011, now Pat. No. 8,370,955, which is a
(Continued)

(51) Int. Cl.
G06F 21/60    (2013.01)
H04W 4/02    (2009.01)
(Continued)

(52) U.S. Cl.
CPC ............. *H04W 4/02* (2013.01); *G06Q 10/0875* (2013.01); *G06Q 20/202* (2013.01);
(Continued)

(58) Field of Classification Search
CPC ......... H04W 8/005; H04W 8/18; H04W 4/02; H04W 4/028; H04W 4/206; H04W 12/00; H04W 12/02; H04L 67/18; H04L 67/24; H04L 67/306; H04L 63/20; G06Q 20/202; G06Q 20/3224; G06Q 30/0207; G06Q 30/0222; G06Q 30/0242; G06Q 30/0261; G06Q 30/0282; G06Q 30/0226; G06Q 30/0601
USPC .................. 726/1, 7, 28; 705/114, 16, 40, 67; 235/375; 370/338, 503; 445/414
See application file for complete search history.

(56) References Cited

U.S. PATENT DOCUMENTS 6,049,711 A    4/2000    Ben-Yehezkel et al.
6,487,601 B1    11/2002    Hubacher et al.
(Continued)

FOREIGN PATENT DOCUMENTS

SE    0702686-7    12/2007
SG    134837    10/2007
WO    WO 2007/081356    7/2007

OTHER PUBLICATIONS

Office Action, U.S. Appl. No. 13/015,306 mail date Jun. 17, 2011.
(Continued)

Primary Examiner — Amare F Tabor
Assistant Examiner — Noura Zoubair
(74) Attorney, Agent, or Firm — Cesari and McKenna, LLP

(57) ABSTRACT

Techniques for facilitating the exchange of information and transactions between two entities associated with two wireless devices when the devices are in close proximity to each other. A first device uses a first short range wireless capability to detect an identifier transmitted from a second device in proximity, ideally using existing radio capabilities such as Bluetooth (IEEE802.15.1-2002) or Wi-Fi (IEEE802.11). The detected identifier, being associated with the device, is also associated with an entity. Rather than directly exchanging application data flow between the two devices using the short range wireless capability, a second wireless capability allows for one or more of the devices to communicate with a central server via the internet, and perform the exchange of application data flow. By using a central server to draw on stored information and content associated with the entities the server can broker the exchange of information between the entities and the devices.

30 Claims, 14 Drawing Sheets

Related U.S. Application Data continuation of application No. 12/364,897, filed on Feb. 3, 2009, now Pat. No. 7,936,736.

(60) Provisional application No. 61/095,001, filed on Sep. 8, 2008, provisional application No. 61/095,359, filed on Sep. 9, 2008.

(51) Int. Cl.

| | | |
|---|---|---|
| *G06Q 10/08* | (2012.01) | |
| *G06Q 20/20* | (2012.01) | |
| *G06Q 30/02* | (2012.01) | |
| *G06Q 30/06* | (2012.01) | |
| *H04L 29/06* | (2006.01) | |
| *H04W 8/00* | (2009.01) | |
| *H04W 12/00* | (2009.01) | |
| *H04W 4/20* | (2009.01) | |
| *G06Q 20/32* | (2012.01) | |
| *H04L 29/08* | (2006.01) | |
| *H04W 88/06* | (2009.01) | |

(52) U.S. Cl.
CPC ....... *G06Q 30/0207* (2013.01); *G06Q 30/0222* (2013.01); *G06Q 30/0226* (2013.01); *G06Q 30/0242* (2013.01); *G06Q 30/0282* (2013.01); *G06Q 30/0601* (2013.01); *G06Q 30/0623* (2013.01); *H04L 63/20* (2013.01); *H04W 4/028* (2013.01); *H04W 8/005* (2013.01); *H04W 12/00* (2013.01); *H04W 88/06* (2013.01); *H04W 4/206* (2013.01); *G06F 21/60* (2013.01); *G06Q 20/3224* (2013.01); *H04L 67/24* (2013.01); *H04L 67/306* (2013.01); *H04L 67/18* (2013.01); *H04L 69/18* (2013.01)

(56) References Cited

U.S. PATENT DOCUMENTS

| | | |
|---|---|---|
| 6,629,149 B1 | 9/2003 | Fraser et al. |
| 6,675,153 B1 | 1/2004 | Cook et al. |
| 6,700,535 B2 | 3/2004 | Gilkes et al. |
| 6,929,149 B2 | 8/2005 | Selfridge et al. |
| 6,978,165 B2 | 12/2005 | Martinez et al. |
| 7,177,594 B2 | 2/2007 | Burr |
| 7,185,204 B2 | 2/2007 | Narayanaswami et al. |
| 7,207,480 B1 | 4/2007 | Geddes |
| 7,213,742 B1 | 5/2007 | Birch et al. |
| 7,213,743 B2 | 5/2007 | Carlson et al. |
| 7,233,960 B1 | 6/2007 | Boris et al. |
| 7,254,406 B2 | 8/2007 | Beros et al. |
| 7,280,847 B2 | 10/2007 | Goldthwaite et al. |
| 7,289,810 B2 | 10/2007 | Jagadeesan et al. |
| 7,305,245 B2 | 12/2007 | Alizadeh-Shabdiz et al. |
| 7,315,944 B2 | 1/2008 | Dutta et al. |
| 7,330,112 B1 | 2/2008 | Emigh et al. |
| 7,349,871 B2 | 3/2008 | Labrou et al. |
| 7,359,674 B2 | 4/2008 | Markki et al. |
| 7,363,494 B2 | 4/2008 | Brainard et al. |
| 7,376,433 B1 | 5/2008 | Hose |
| 7,379,920 B2 | 5/2008 | Leung et al. |
| 7,403,762 B2 | 7/2008 | Morgan et al. |
| 7,414,988 B2 | 8/2008 | Jones et al. |
| 7,433,649 B2 | 10/2008 | Toulis et al. |
| 7,433,694 B2 | 10/2008 | Morgan et al. |
| 7,434,723 B1 | 10/2008 | White et al. |
| 7,471,954 B2 | 12/2008 | Brach et al. |
| 7,502,933 B2 | 3/2009 | Jakobsson et al. |
| 7,522,058 B1 | 4/2009 | Light et al. |
| 7,546,141 B2 | 6/2009 | Leon et al. |
| 7,580,699 B1 | 8/2009 | Shaw et al. |
| 7,620,026 B2 | 11/2009 | Anschutz et al. |
| 7,711,100 B2 | 5/2010 | Dennis |
| 7,711,620 B2 | 5/2010 | Abifaker |
| 7,714,712 B2 | 5/2010 | Emigh et al. |
| 7,716,484 B1 | 5/2010 | Kaliski, Jr. |
| 7,876,701 B2 | 1/2011 | Li et al. |
| 7,936,736 B2 | 5/2011 | Proctor, Jr. et al. |
| 7,991,664 B1 | 8/2011 | Stone |
| 8,024,272 B2 | 9/2011 | Doran et al. |
| 8,275,359 B2 | 9/2012 | Drennan |
| 2001/0036200 A1* | 11/2001 | Nelson et al. ............... 370/503 |
| 2002/0073027 A1 | 6/2002 | Hui et al. |
| 2002/0128932 A1 | 9/2002 | Yung et al. |
| 2002/0188565 A1 | 12/2002 | Nakamura et al. |
| 2003/0045272 A1 | 3/2003 | Burr |
| 2003/0074259 A1 | 4/2003 | Slyman et al. |
| 2003/0195808 A1 | 10/2003 | Brown et al. |
| 2004/0030601 A1* | 2/2004 | Pond et al. ..................... 705/16 |
| 2004/0167837 A1 | 8/2004 | Reel et al. |
| 2004/0186768 A1 | 9/2004 | Wakim et al. |
| 2004/0190468 A1 | 9/2004 | Saijonmaa |
| 2004/0203895 A1 | 10/2004 | Balasuriya |
| 2004/0245332 A1 | 12/2004 | Silverbrook et al. |
| 2004/0264466 A1 | 12/2004 | Huang |
| 2005/0165667 A1 | 7/2005 | Cox |
| 2005/0174975 A1* | 8/2005 | Mgrdechian et al. ......... 370/338 |
| 2005/0188062 A1 | 8/2005 | Li et al. |
| 2006/0069922 A1 | 3/2006 | Jelinek et al. |
| 2006/0079284 A1 | 4/2006 | Lu et al. |
| 2006/0085419 A1 | 4/2006 | Rosen |
| 2007/0060130 A1 | 3/2007 | Gogic et al. |
| 2007/0078851 A1 | 4/2007 | Grell et al. |
| 2007/0096909 A1 | 5/2007 | Lally |
| 2007/0100651 A1* | 5/2007 | Ramer et al. ..................... 705/1 |
| 2007/0106612 A1 | 5/2007 | O'Brien et al. |
| 2007/0121534 A1 | 5/2007 | James et al. |
| 2007/0178886 A1 | 8/2007 | Wang et al. |
| 2007/0187491 A1 | 8/2007 | Godwin et al. |
| 2007/0242765 A1 | 10/2007 | Parizhisky et al. |
| 2007/0255653 A1 | 11/2007 | Tumminaro et al. |
| 2007/0280269 A1 | 12/2007 | Rosenberg |
| 2008/0010190 A1 | 1/2008 | Rackley, III et al. |
| 2008/0037487 A1 | 2/2008 | Li et al. |
| 2008/0051059 A1 | 2/2008 | Fisher |
| 2008/0097851 A1 | 4/2008 | Bemmel et al. |
| 2008/0097879 A1 | 4/2008 | Sadowski et al. |
| 2008/0109741 A1 | 5/2008 | Messing et al. |
| 2008/0114647 A1 | 5/2008 | Singer et al. |
| 2008/0114699 A1 | 5/2008 | Yuan et al. |
| 2008/0133403 A1 | 6/2008 | Hamzeh |
| 2008/0167961 A1 | 7/2008 | Wentker et al. |
| 2008/0181154 A1 | 7/2008 | Sherman |
| 2008/0182591 A1 | 7/2008 | Krikorian |
| 2008/0182592 A1 | 7/2008 | Cha et al. |
| 2008/0189394 A1 | 8/2008 | Ross et al. |
| 2008/0214166 A1 | 9/2008 | Ramer et al. |
| 2008/0222711 A1 | 9/2008 | Michaelis |
| 2008/0261564 A1 | 10/2008 | Logan |
| 2008/0262928 A1 | 10/2008 | Michaelis |
| 2008/0288408 A1 | 11/2008 | Jacobsen |
| 2008/0306825 A1 | 12/2008 | Schick et al. |
| 2008/0313079 A1 | 12/2008 | Van Bosch et al. |
| 2008/0313082 A1 | 12/2008 | Van Bosch et al. |
| 2009/0016248 A1 | 1/2009 | Li et al. |
| 2009/0016250 A1 | 1/2009 | Li et al. |
| 2009/0016255 A1 | 1/2009 | Park |
| 2009/0016315 A1 | 1/2009 | Laroia et al. |
| 2009/0016353 A1 | 1/2009 | Li et al. |
| 2009/0016524 A1 | 1/2009 | Park et al. |
| 2009/0019168 A1 | 1/2009 | Wu et al. |
| 2009/0022096 A1 | 1/2009 | Walley et al. |
| 2009/0037286 A1 | 2/2009 | Foster |
| 2009/0061901 A1 | 3/2009 | Arrasvuori et al. |
| 2009/0063624 A1 | 3/2009 | Nordstrom et al. |
| 2009/0170559 A1 | 7/2009 | Phillips |
| 2009/0177530 A1 | 7/2009 | King et al. |
| 2009/0197681 A1 | 8/2009 | Krishnamoorthy et al. |
| 2009/0270120 A1 | 10/2009 | Park |
| 2009/0271211 A1 | 10/2009 | Hammad |
| 2009/0281904 A1 | 11/2009 | Pharris |
| 2009/0282130 A1 | 11/2009 | Antoniou et al. |
| 2009/0285119 A1 | 11/2009 | Horn et al. |

(56) References Cited

U.S. PATENT DOCUMENTS

| | | |
|---|---|---|
| 2009/0287827 A1 | 11/2009 | Horn et al. |
| 2009/0303250 A1 | 12/2009 | Phillips |
| 2009/0303926 A1 | 12/2009 | Den Hartog et al. |
| 2009/0307132 A1 | 12/2009 | Phillips |
| 2009/0307133 A1 | 12/2009 | Holloway |
| 2009/0310517 A1 | 12/2009 | Narayanan et al. |
| 2009/0313105 A1 | 12/2009 | Magnusson |
| 2009/0323647 A1 | 12/2009 | Park et al. |
| 2009/0323648 A1 | 12/2009 | Park et al. |
| 2009/0325601 A1 | 12/2009 | Park et al. |
| 2010/0030651 A1 | 2/2010 | Matotek et al. |
| 2010/0051685 A1 | 3/2010 | Royyuru et al. |
| 2010/0062758 A1 | 3/2010 | Proctor, Jr. et al. |
| 2010/0063867 A1 | 3/2010 | Proctor, Jr. et al. |
| 2010/0096450 A1 | 4/2010 | Silverbrook et al. |
| 2010/0124196 A1 | 5/2010 | Bonar et al. |
| 2010/0141437 A1 | 6/2010 | Karam et al. |
| 2010/0201536 A1 | 8/2010 | Robertson et al. |
| 2011/0119733 A1 | 5/2011 | Proctor, Jr. et al. |
| 2012/0066043 A1 | 3/2012 | Carmichael et al. |
| 2012/0066199 A1 | 3/2012 | Ramer et al. |

OTHER PUBLICATIONS

Office Action, U.S. Appl. No. 13/015,306 mail date Jul. 17, 2012.
Notice of Allowance, U.S. Appl. No. 13/015,306 mail date Nov. 8, 2012.
Office Action, U.S. Appl. No. 13/015,306 mail date Jan. 9, 2012.
Notice of Allowance, U.S. Appl. No. 13/212,723 mail date Jan. 16, 2013.
Heeger, David, "Signal Detection Theory Handout," University of Stanford, 1998, www.psych.stanford.edu/~lera/psych115s/notes/signal/, 7 pages.
Wauters, R., "TC50: Gift Card Auction Site Rackup Aims to Shake Up Market" [online], Sep. 14, 2009. Retrieved from the Internet URL: http://techcrunch.com/2009/09/14/tc50-gift-card-auction-site-rackup-aims-to-shake-up-market/, one page.
Rusli, E., "Gift card marketplace Cardpool Introduces Instand Redemption, Attracts Super Angels" [online], Sep. 7, 2010. Retrieved from the Internet URL: http://techcrunch.com/2010/09/07/gift-card-marketplace-cardpool-plasticjungle/, one page.
Office Action, U.S. Appl. No. 12/364,823, mail date Dec. 28, 2010.
Office Action, U.S. Appl. No. 12/364,828, mail date Sep. 15, 2010.
Notice of Allowance, U.S. Appl. No. 12/364,828, mail date Jul. 1, 2010.
Office Action, U.S. Appl. No. 12/364,938, mail date Sep. 14, 2010.
Office Action, U.S. Appl. No. 12/364,938, mail date Jul. 21, 2011.
Office Action, U.S. Appl. No. 12/364,819, mail date Nov. 15, 2010.
Final Office Action, U.S. Appl. No. 12/364,819, mail date Jun. 28, 2011.
U.S. Appl. No. 60/758,010, filed Jan. 11, 2006 by Rajiv Laroia for Methods and apparatus for facilitating identification, synchronization or acquisition using beacon signals, 30 pages.
U.S. Appl. No. 60/758,011, filed Jan. 11, 2006 by Rajiv Laroia for Methods and apparatus for using beacon signals for identification, synchronization or acquisition in an ad hoc wireless network, 26 pages.
U.S. Appl. No. 60/758,012, filed Jan. 11, 2006 by Rajiv Laroia for Methods and apparatus for using beacon signals in a cognitive radio network, 24 pages.
U.S. Appl. No. 60/845,051, filed Sep. 15, 2006 by Junyi Li for Beacons in a mixed wireless communication system, 30 pages.
U.S. Appl. No. 60/845,052, filed Sep. 15, 2006 by Aleksandar Jovicic for Beacons in a mixed wireless communication system, 29 pages.
U.S. Appl. No. 60/863,304, filed Oct. 27, 2006 by Rajiv Laroia for Power Allocation Scheme, 15 pages.
Ortiz-Yepes, "Enhancing Authentication in eBanking with NFC enabled mobile phones;" Masters Thesis, Department of Mathematics and Computer Science, Eihdhoven University of Technology; Aug. 11, 2008.
Office Action, U.S. Appl. No. 12/364,819, mail date Apr. 16, 2012.
Office Action, U.S. Appl. No. 13/212,766, mail date Apr. 26, 2012.
Office Action, U.S. Appl. No. 13/213,028, mail date May 5, 2012.
http://www.smartcardalliance.org/resources/lib/Proximity_Mobile_Payments_200709.pdf; "Smart Card Alliance" 39 pages, Sep. 2007, retrieved from Internet Mar. 21, 2012.
http://www.ietf.org/rfc/rfc4793.txt; The EAP Protected One-Time Password Protocol (EAP-POTP); 77 pages, Feb. 2007; retrieved from Internet Mar. 21, 2012.
Office Action, U.S. Appl. No. 12/364,819, mail date Aug. 26, 2010.
Office Action, U.S. Appl. No. 12/364,823, mail date Jun. 16, 2010.
Office Action, U.S. Appl. No. 12/364,828, mail date May 14, 2010.
Office Action, U.S. Appl. No. 12/364,938, mail date May 13, 2010.
S. S. (Peter) Wang et al., E-911 Location Standards and Location Commercial Services, Nokia Research Center (2000) 5 pages.
Jonathan P. Munson & Vineet K. Gupta, Location-Based Notification as a General-Purpose Service, Proceedings of the 2nd International Workshop on Mobile Commerce (2002) 5 pages.
File History of U.S. Appl. No. 60/814,254, filed Jun. 16, 2006, 44 pages.

* cited by examiner

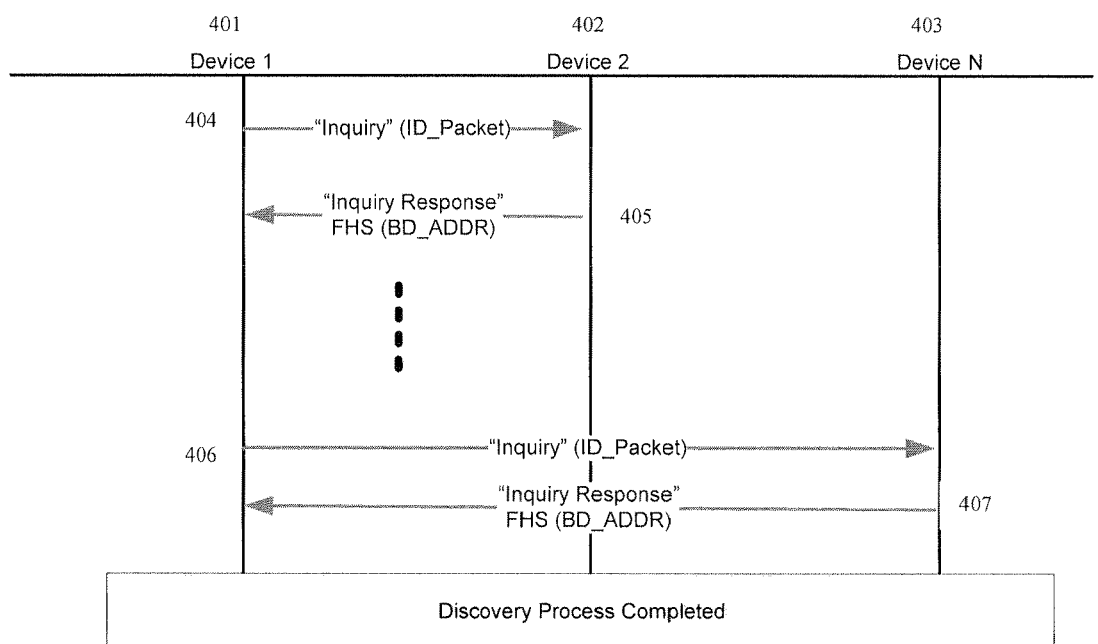
Figure 4 – 802.15.1-2002 (Bluetooth V1.2) Device Discovery

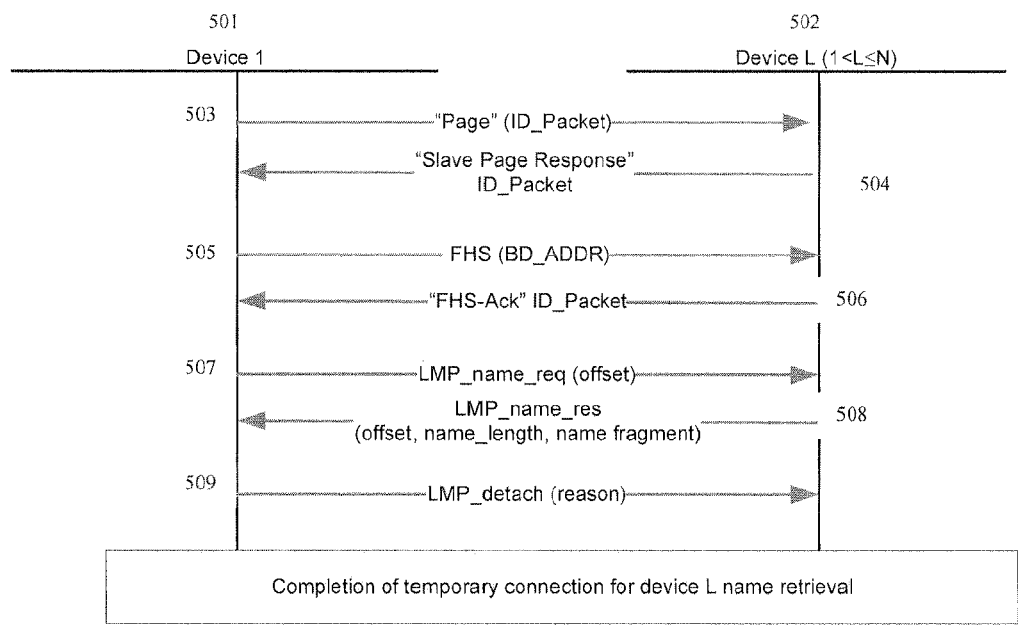
Figure 5 – 802.15.1-2002 (Bluetooth V1.2) Remote Name Request

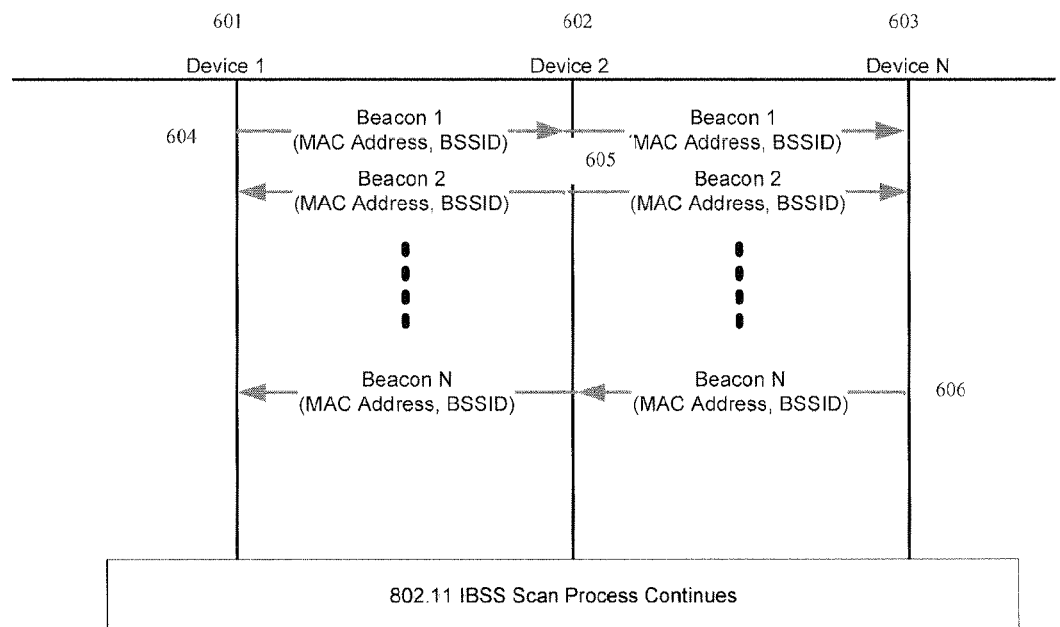
Figure 6 - 802.11 IBSS Beacon Process

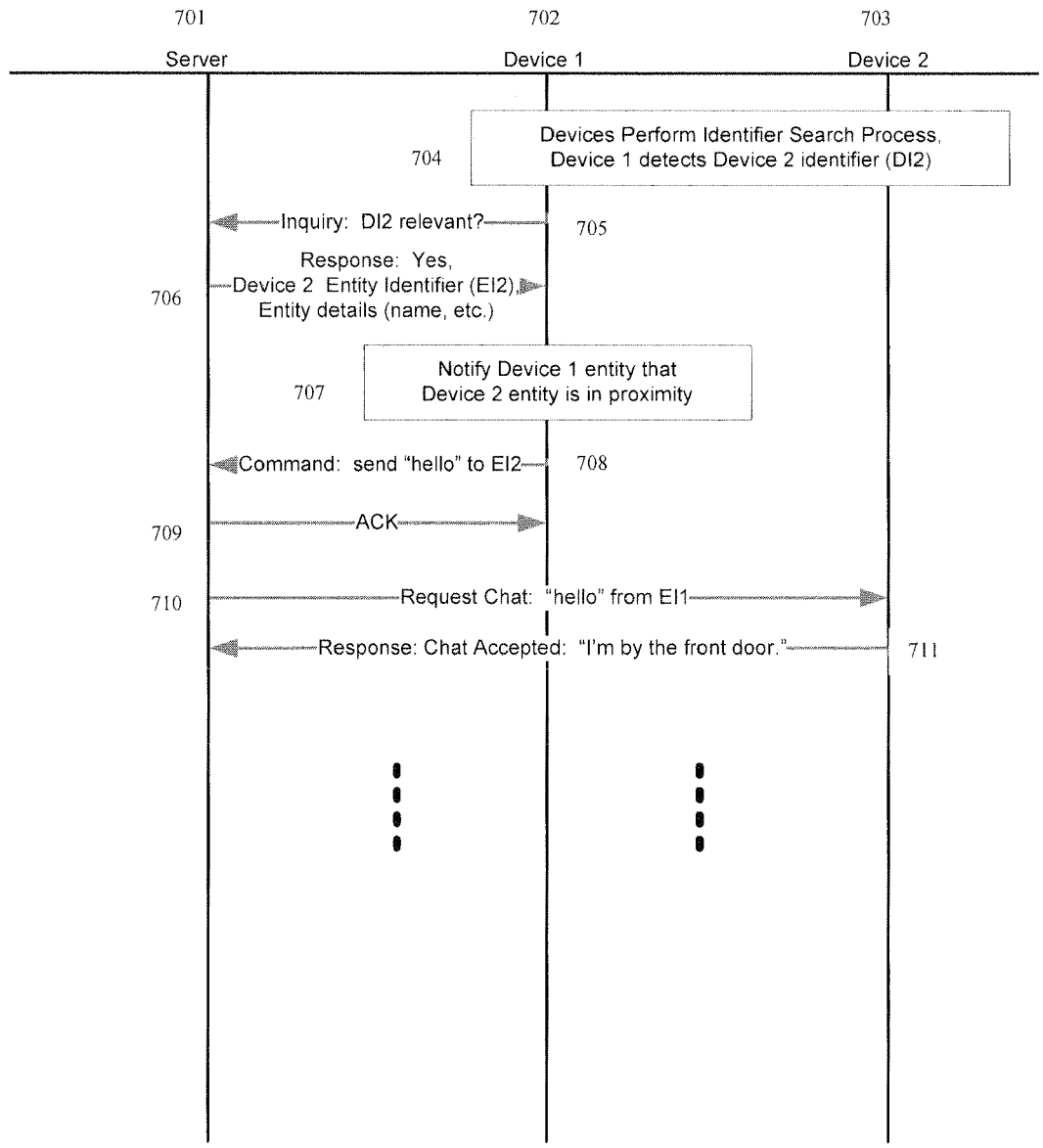
Figure 7 – Process of Detection and entering a Chat Session

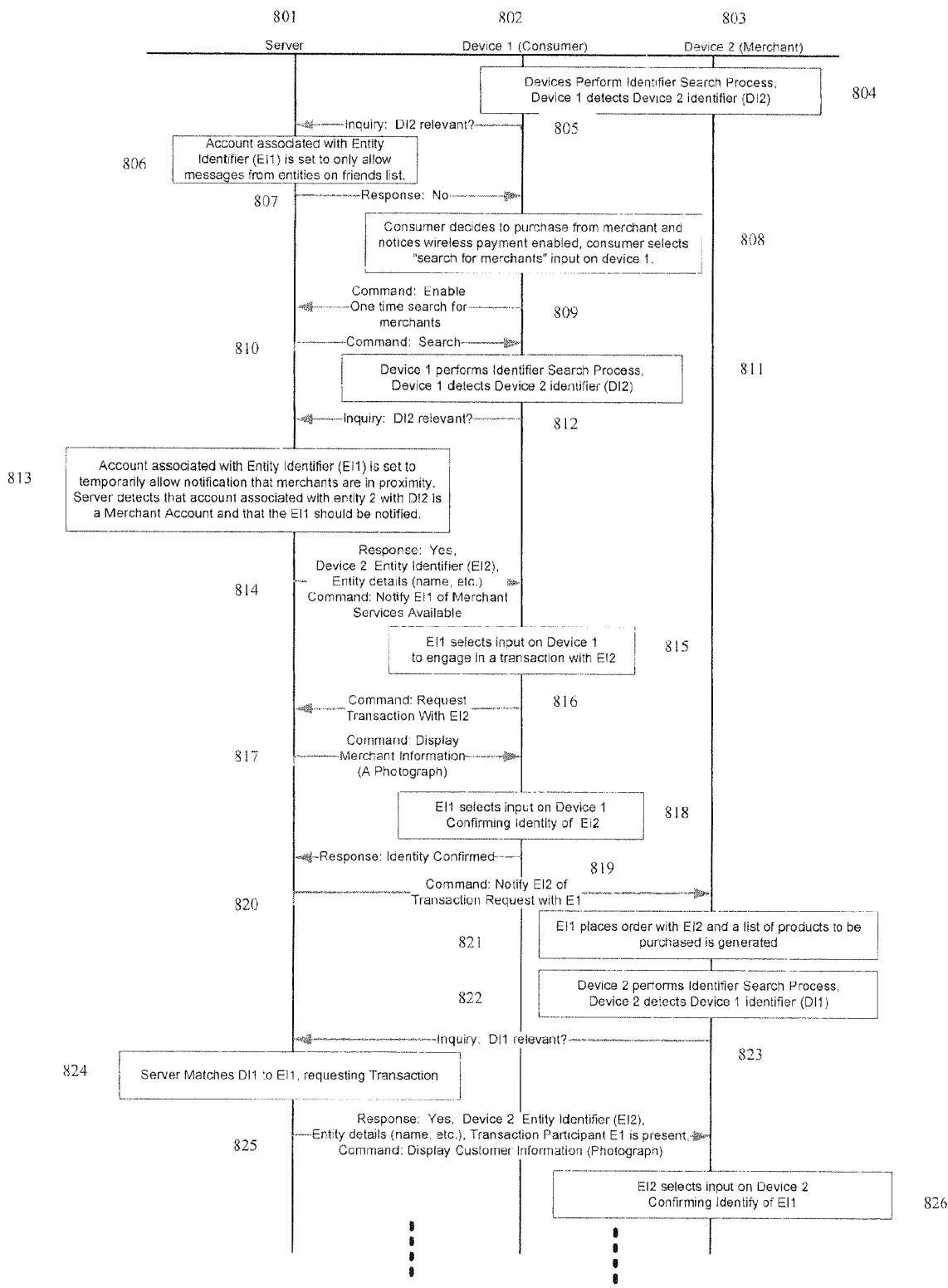
Figure 8A – E Commerce Process

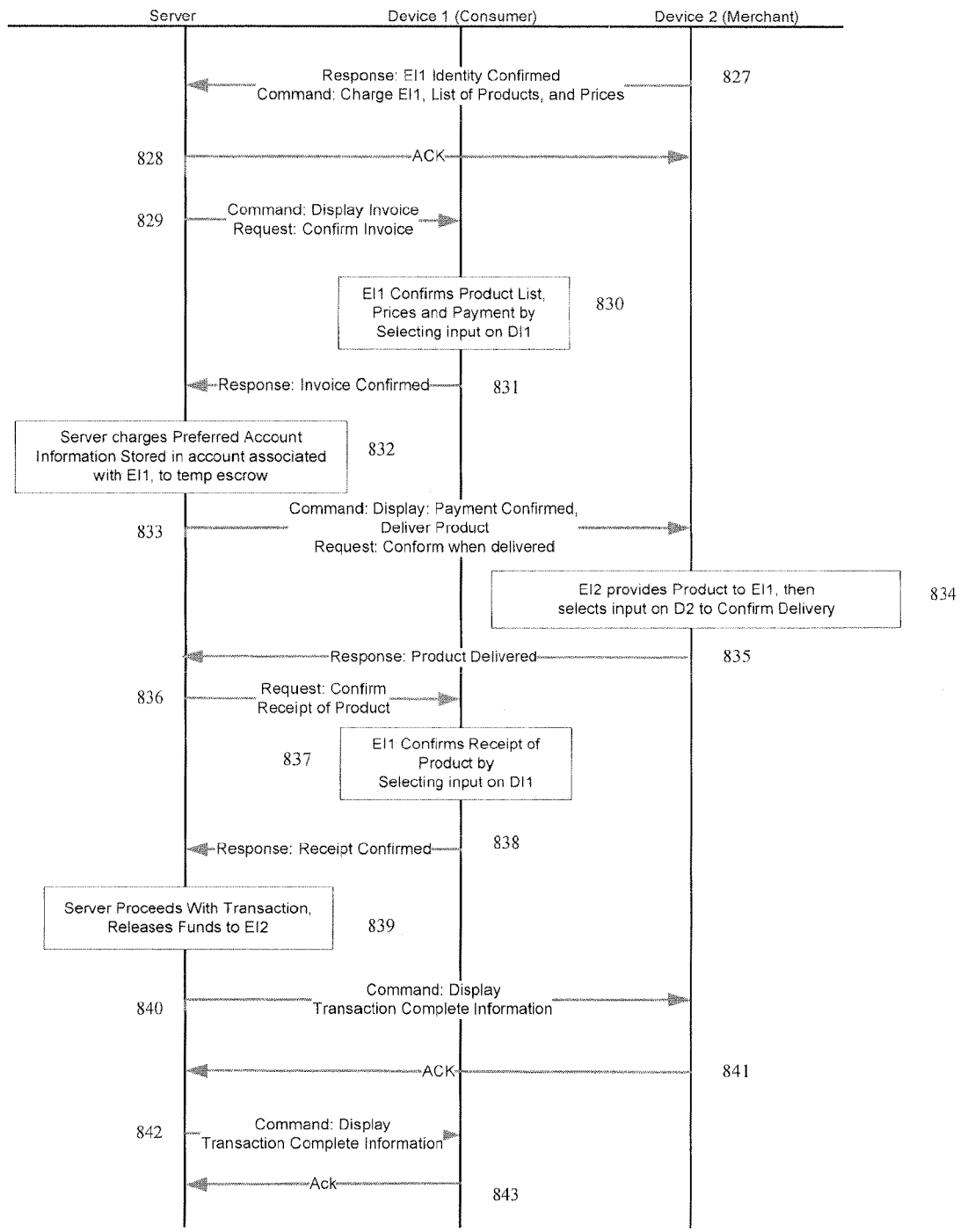
Figure 8B – E Commerce Process Continued

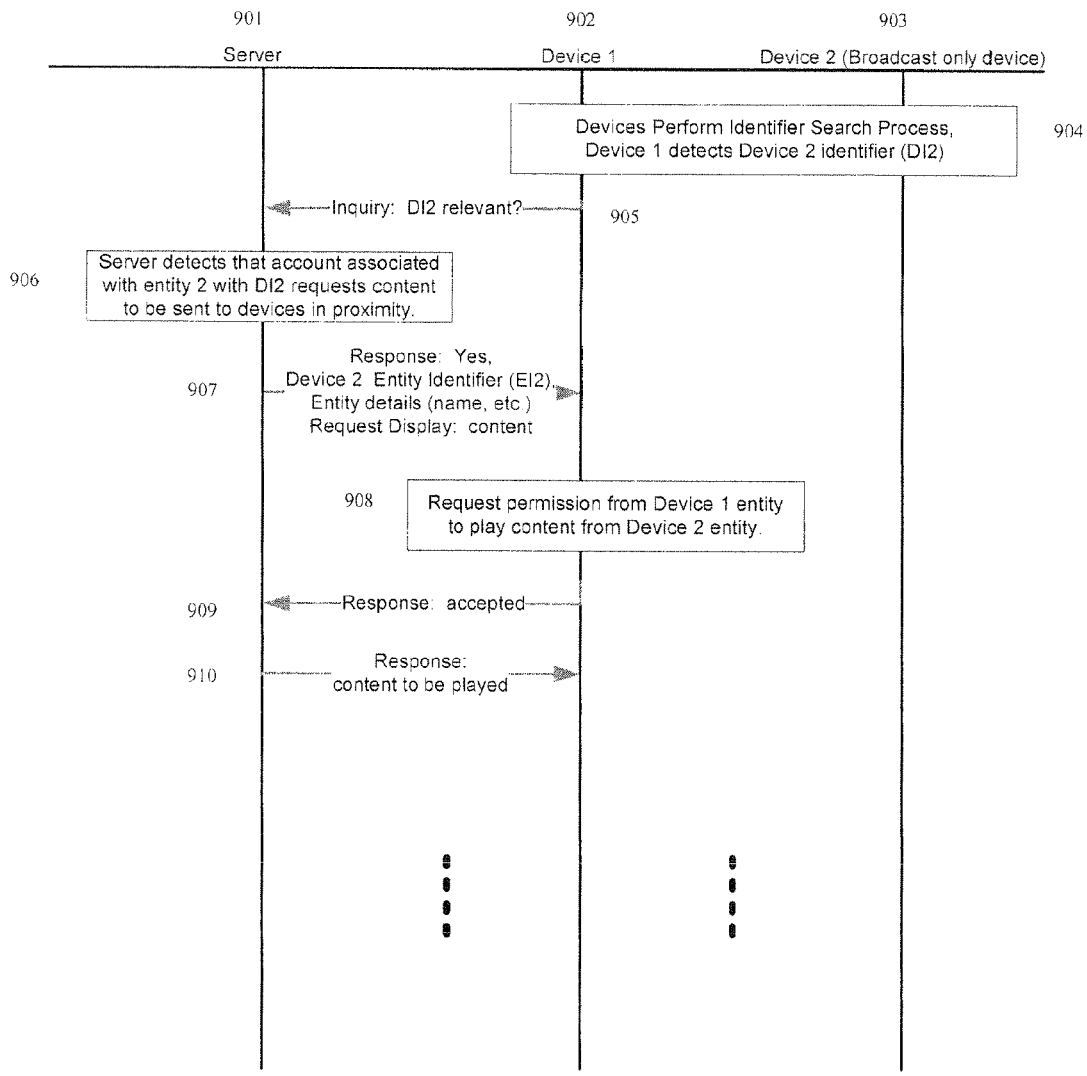
Figure 9 Broadcast and mobile device interaction

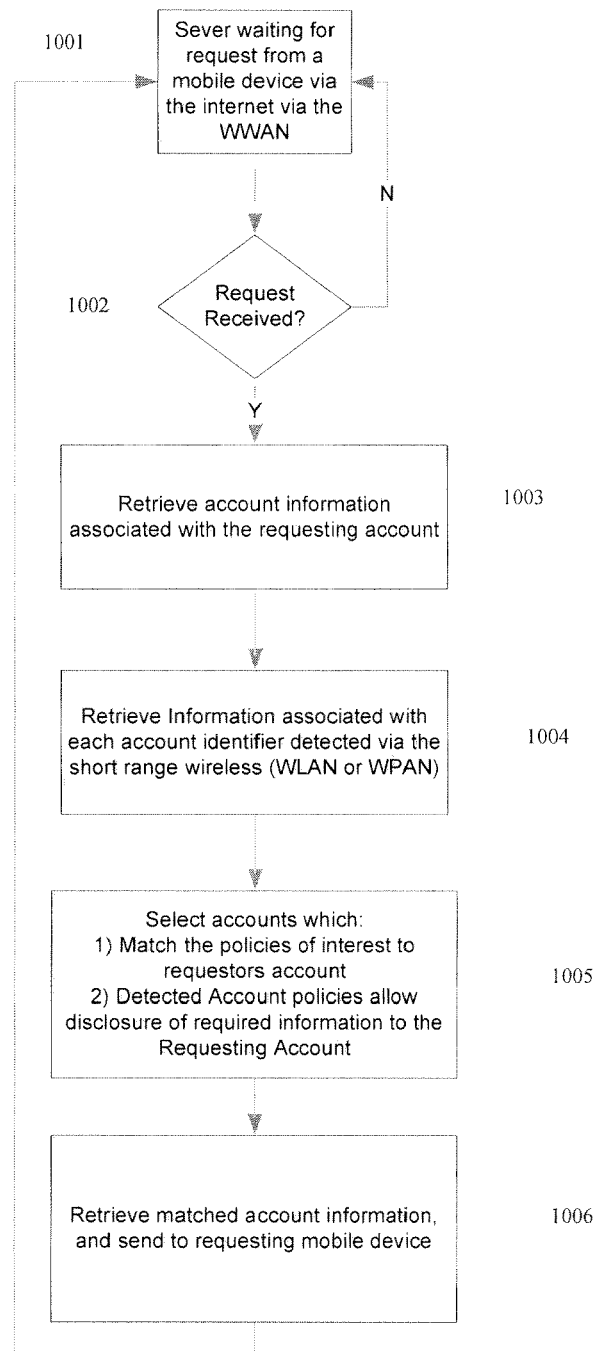
Figure 10 – Server Processing Example for Detected Device

Figure 11 – Example Individual Account Record associated with an Entity Stored in the Server

| Record Index | Field | Field Information Group Disclosure Policy Assignments List |
|---|---|---|
| 1 | Account Number | [All, Explicit Approval, NONE, 1..N] |
| 2 | Identifier | |
| 3 | Identifier Type [Fixed MAC Address, Dynamic MAC Address, BSSID, Device Name] | |
| 4 | Number of Fields | |
| 5 | Field List | |
| 6 | Account User Name | NONE |
| 7 | Account Password | NONE |
| 8 | Entity Name | |
| 9 | Entity Address | |
| 10 | Entity Type [Individual, Merchant, Broadcast Entity] | |
| 11 | Billing Information | |
| 12 | Device Type | |
| 13 | Device IP Address | |
| 14 | Device SMS Phone Number | |
| 15 | Device Capabilities | |
| 16 | Entity AutoPlay Script 1 | |
| 17 | Entity AutoPlay Script 2 | |
| 18 | Detected AutoPlay Script 1 | |
| 19 | Detected AutoPlay Script 2 | |
| 20 | Entity Instant Message Address List | |
| 21 | Information Group Disclosure Policy 1 (IGDP#) [Characteristic 1 (C1), C2,.. CN, Friend List 1 (FL1), FL2, .. FLN, etc] | |
| 22 | Information Group Disclosure Policy 2 | |
| 23 | Information Group Disclosure Policy 3 | |
| 24 | Information Group Disclosure Policy 4 | |
| 25 | Additional Personal Information Field 1 (APIF#) [Content Type/Content ] (Picture, mp3, xml/AJAX, Text, Contact List, URL (MySpace, Facebook, Loopt), Login Credentials (MySpace, Facebook, Loopt, Itunes, etc.), Payment Information (Credit Card Information, PayPal Information, etc.), IM Credentials List (Username/Password)) | |
| 26 | Additional Personal Information Field 2 | |
| 27 | Additional Personal Information Field 3 | |
| ... | | |

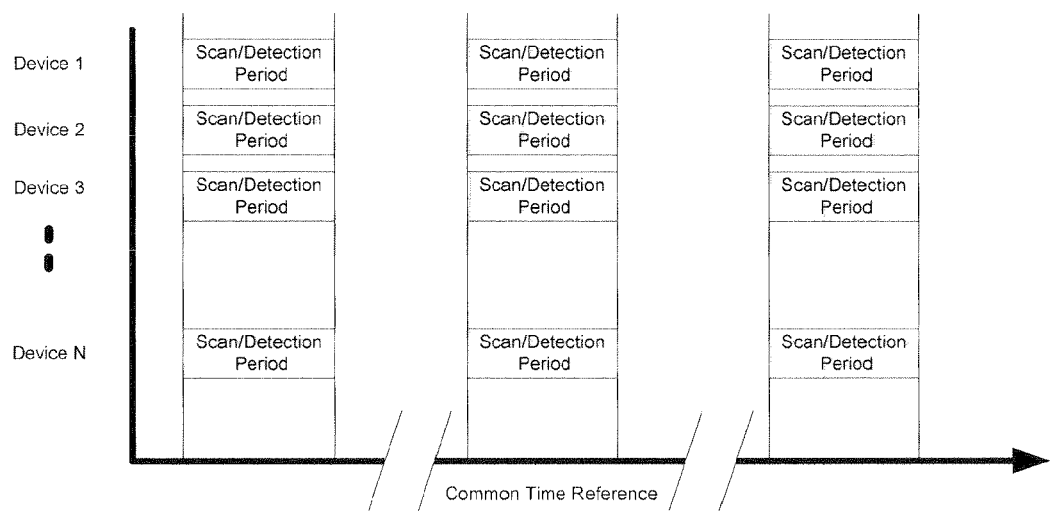
Figure 12 Use of common time reference for intermittent detection intervals

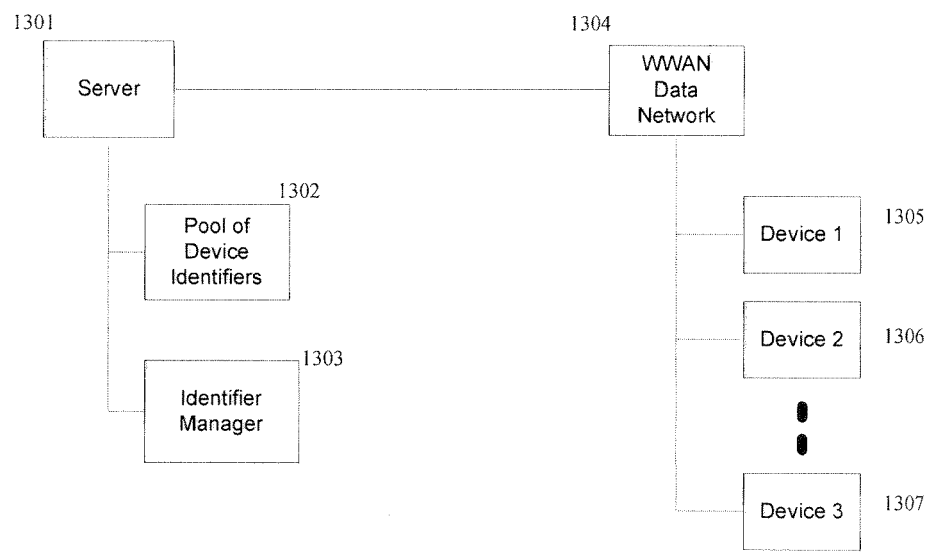
Figure 13 - Management of Device Identifiers by Identifier Manager in the Server

ENFORCING POLICIES IN WIRELESS COMMUNICATION USING EXCHANGED IDENTITIES

RELATED APPLICATION(S)

This application is a divisional of U.S. application Ser. No. 13/015,306 filed on Jan. 27, 2011 which is a continuation of U.S. application Ser. No. 12/364,897 filed on Feb. 3, 2009 which claims the benefit of U.S. Provisional Application No. 61/095,001, entitled "Central Server Enabled Proximity Based Applications Utilizing Both Short Range, and Wide Area Wireless Radios", filed on Sep. 8, 2008 and U.S. Provisional Application No. 61/095,359, entitled "Central Server Enabled Proximity Based Applications Utilizing Both Short Range, and Wide Area Wireless Radios", filed on Sep. 9, 2008. The entire teachings of the above applications are incorporated herein by reference.

BACKGROUND OF THE INVENTION

Several key internet applications have become increasingly popular in recent years. A current trend in internet usage involves social networking. Social networking involves making use of internet services which allow for the interaction and sharing of information between users of service.

Recently, mobile wireless communication standards have progressed to the point where relatively high speed data connections are possible to the phone over the wireless wide area network (WWAN). These standards include 1xEV-DO, HSDPA, EDGE, GPRS, Wi-Max (IEEE802.16e) and the like. Some social networking sites have included interfaces to their web sites optimized to make use of such high data rate mobile services for use on a mobile phone. These services are referred to as mobile social networking. For the most part, these services are simply versions of the standard social networking, redesigned to be usable on a mobile phone, adding little in the way of increased capability.

With the common capability of global positioning system (GPS) receivers being incorporated into phones, some additional capabilities have been added to some mobile social networking interfaces by incorporating location information for the user and that of the individual they interact with.

These services are utilizing GPS to determine the location of one mobile wireless user and to another to facilitate mobile social networking. An example of an existing application utilizing this approach is Loopt (www.loopt.com), which coordinates location based social interaction. One problem with GPS based mobile application involves the GPS receiver not receiving sufficient signal strength in many indoor locations. As a result these enhanced capabilities have typically been targeted at either navigation to a specified location, or as in the case with Loopt, allowing a user to see where their friends are located in a relatively large geographic location, on a map.

Another popular application for the internet is electronic commerce. Just as with social network, e-commerce services have provided interfaces optimized for use on mobile phones which provide basically the same capabilities as the standard interfaces. Very little location or proximity information has been used to enhance the mobile e-commerce experience.

Some attempts have been made to utilize RFID (Radio Frequency Identification) chips to perform mobile payments. This approach requires the additional hardware on a phone in the form of a RFID chip, or other specialized features. As a result, mobile electronic commerce has mostly allowed users to perform transaction with a remote party, such as purchasing an item on ebay (www.ebay.com). To date mobile electronic payments for individuals who are in close proximity to each other have not been practical for a number of reasons. First there is a need for the individuals to have a third trusted party to help facilitate the electronic transaction. Secondly, there needs to be a convenient, electronically secure, personally secure and anonymous method for each of the individuals to specify the party with which they wish to engage in a transaction. Thirdly, there is a need to cross validate the identities of the individuals engaged in the transaction. Finally, this method must work in indoors locations.

Most mobile phones on the market today support at least two wireless standards; one for the cellular wireless wide area network connection (WWAN) and one for a wireless personal or local area network (WPAN, WLAN). The cellular connection or WWAN is utilized for voice and data and can adhere to many different standards such as CDMA (IS-2000), GSM, W-CDMA, WiMax, etc. The WPAN or WLAN connection is typically for short range communications and is often used for wireless hands free devices, such as headsets, peripherals, or higher speed internet connections. The typical standards used for short range wireless communications include Bluetooth, Wi-Fi, and in some cases Ultra-Wide-Band (UWB).

In another approach to mobile social networking some services have attempted to utilize short range wireless capabilities often available on phones such as IEEE802.11 (Wi-Fi) or Bluetooth to facilitate peer to peer communications. These are also referred to a MANETs or Mobile Ad-hoc Networks. These services typically consist of a software application operating on a mobile phone using peer to peer networks to facilitate communication between wireless devices. Examples of such existing applications include Mobile-Cheddar, Peer-2-Me, and Flobbi. Published US Patent application US 2008/0182591 A1 filed Dec. 13, 2007 describes one such peer to peer approach. One issue with these approaches is that one can not communicate with a peer once the devices are no longer in proximity. A further disadvantage is that all information to be exchanged must be stored locally on each of the peer devices as the communication occurs directly between the two devices and any policy for the delivery of locally stored content is difficult to enforce without the potential for fraud such as spoofing identities between the peers. Such fraud may lead to concerns of personal safety or privacy allowing the identity of an individual to be determined when it is not desired. Further this peer to peer model is inadequate for mobile electronic commerce in part due to the lack of an independent third party to facilitate the services required for a secure proximity based mobile electronic transaction as previously mentioned.

SUMMARY OF THE INVENTION

The present invention is generally concerned with facilitating the exchange of information and transactions between two entities associated with two wireless devices when the devices are in close proximity to each other utilizing both a short range and a long range wireless capability.

Preferred embodiments of the present invention are generally concerned with facilitating the exchange of information and transactions between two entities associated with two wireless devices when the devices are in close proximity to each other. In one embodiment, this can be accomplished by a first device using a first short range wireless capability to detect an identifier transmitted from a second device in proximity to the first device, ideally using existing short range radio communication standard capabilities such as Bluetooth (IEEE802.15.1-2002) or Wi-Fi (IEEE802.11). The detected identifier, being associated with the device, is also associated with an entity. Rather than directly exchanging application data flow between the two devices using the short range wireless capability, a second wireless capability then allows for one or more of the devices to communicate with a central server via the internet, and perform an exchange of application data flow. By using a central server to draw on stored information and content associated with the entity or entities, the server can broker the exchange of information between the entities and the devices. In a preferred embodiment, this exchange may be comprised of information stored on the server associated with a detected entity, and it may be comprised of information received from the detected device via the second wireless capability and facilitated by the server.

In addition, the server can also allow for a brokering service, ideally independent of the entities, to enable the application of policy based on the identity of the two entities for the disclosure of stored information associated with the entities, the flow in information between the devices and the entities, and the enablement of procedures such as security verification between the entities.

Applications running on a device may also interact with the server to perform various functions, for example retrieving information associated with an entity or device, by utilizing a detected identifier. Such information may include stored content associated with the entity's account record such as music, pictures, links to social networking sites, instant messaging addresses, advertising content, and even executable scripts or application such as in AJAX. An example of such an application may include the detection of a device's identifier in a fixed location allowing for tour guide like information to be provided for that location.

As the server may be running applications which perform more function than just the retrieval of content, a pre-defined interaction process may also be applied by the server to the devices such as allowing the approval to share private content with the entity associated with the detected device. This process may eventually allow or disallow the sharing of information and to facilitate the interacting with another entity.

As a more complex example, in other embodiments, the devices may utilize the server as a third party to provide for new capabilities such as a secure three way e-commerce transaction between two entities. In this more complex process, the server may require confirmation of each party's identity with visual cross verification of the parties using pictures or other unique identifiers. The server may use this visual cross verification in conjunction with detecting that the individuals are in proximity with each other. The server may verify the proximity using GPS or using the peer to peer detection process in another embodiment. Further, the server may facilitate a process requiring each party to perform a step by step confirmation during the transaction including the stages of: the request for purchase, the payment, the receipt of goods and services, and the providing of payment receipt.

This differs from the approaches employed by prior art location aware mobile social networking techniques in that no GPS is needed to determine when one device is in proximity to another. Many wireless devices in use are not GPS-capable, and even when they are, GPS will often not operate indoors or where the GPS signal is weak. Using a peer to peer detection process to locate nearby devices allows for the operation of proximity detection indoors.

Preferred embodiments of the present invention can also differ from known peer to peer based social networking in that the information flow between the devices running the applications are over the wide area network via a central server, rather than carried over the peer to peer network itself. An example of this is a service called Flobbi, as discussed previously, where community members can identify each other via Bluetooth transmissions, then interact with chat. The messaging in this case is carried over Bluetooth itself. A distinction from such peer to peer approaches is the use of a central server to "broker" the transactions between peers, enhancing the ability to manage security and information disclosure. Such use allows for the opportunity to customize delivered content to include elements such as advertising or other content customized to the recipient based on additional information such as known personal purchasing history, or interests.

A further distinction of the preferred embodiment is the use of a central server to determine identities of detected peer devices, which additionally allows for secure and fraud resistant application of policies for the disclosure of information and content. An issue with the existing pure peer to peer approaches is that they are not capable of enforcing policy associated with the disclosure of information to unknown entities in a secure and fraud resistant manor. One reason for this is that information related to a user's device must be disclosed in the process of detection in the form of a static identifier. By the nature of the identifier, it must be static or peers would not be able to directly determine the identity of a friend over time with the information stored on their device. By using a central server, the system may coordinate the change of the identifiers from time to time such that the disclosure of an identifier by one device to another does not compromise the identity of the device. In this case the identifier may be assigned from a central server and such server coordinate the identifier's change from time to time.

Reliance on a central server also allows the secure and fraud resistant application of disclosure policy. Such policy might include the verification of the identity of the party to which information (identity and presence for instance) or content (pictures of the account owner) is to be provided. Such verification is performed in an anonymous way such that in the process of verifying information associated with each party, no personal information is disclosed between the parties prior to satisfaction of some pre-set policy such as inclusion on a friend list or belonging to a specific group or organization. Another important policy required for such services would be the determination of any past negative feed back ratings by other past peers for behavior of the particular user to which the information is to be provided. An individual with significant poor ratings having detected a peer, may be denied access to personal information or even notification of arrival of the detected peer based on the server policy setting by the detected peer or the server in general.

A further distinction is to enable electronic payments for individuals who are in close proximity to each other. The central server can act as a third trusted party to help facilitate the electronic transaction between the individuals. Secondly, the server allows for a convenient, electronically secure, personally secure and anonymous method for each of the individuals to specify the party with which they wish to engage in a transaction. Thirdly, participants in a transaction can cross validate the identities of the individuals engaged in the transaction. Finally, because this method is proximity based it will also work indoors or in other situations where GPS location information is not available.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4 is a message sequence chart showing the Bluetooth discovery process using in one embodiment.

FIG. 5 is a message sequence chart showing the Bluetooth Remote Name Request Process.

FIG. 6 is a message sequence chart showing the IBSS beacon process.

FIG. 7 is a message sequence chart showing the interaction between the server and two devices performing a detection and entering a chat application.

FIG. 8A is a message sequence chart showing an E-commerce example.

FIG. 8B is a continued example message sequence chart showing an E-commerce example.

FIG. 9 is a message sequence chart showing an example of a mobile device and a fixed broadcast device interaction.

FIG. 10 is a flow diagram for the server processing associated with the detection process.

FIG. 11 is an example individual account record stored in the server associated with an Entity.

FIG. 12 illustrates a timing reference for intermittent active and dormant times.

FIG. 13 shows a diagram of functional blocks associated with management of dynamically assigned device identifiers.

DETAILED DESCRIPTION OF THE INVENTION

A description of example embodiments of the invention follows.

The teachings of all patents, published applications and references cited herein are incorporated by reference in their entirety.

Figure 1:
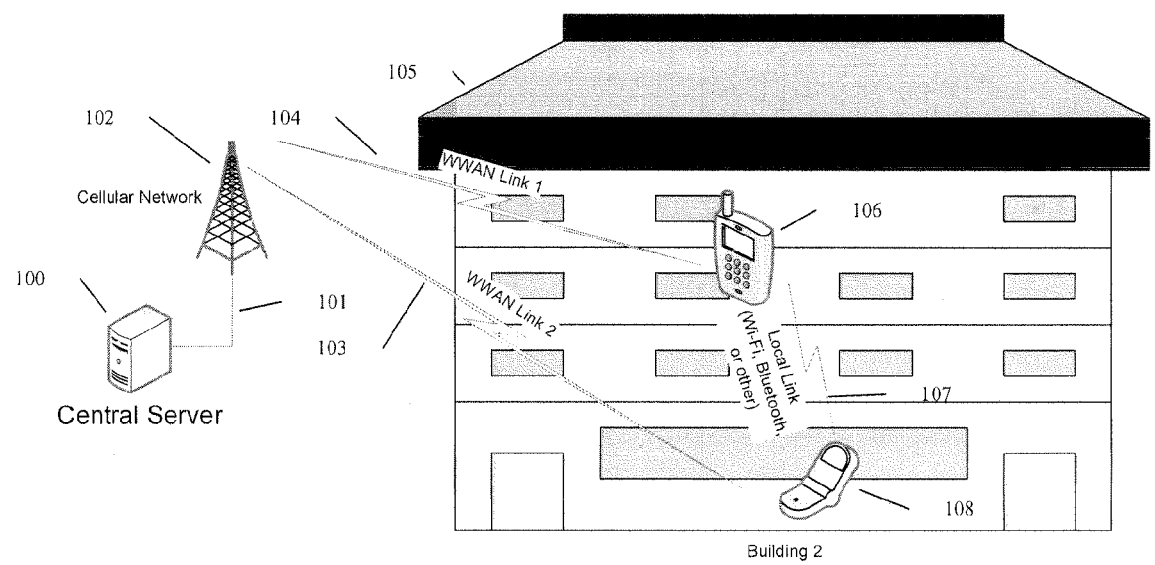
FIG. 1 is a block diagram of two mobile devices utilizing a preferred embodiment.

FIG. 1 is a block diagram of two mobile devices utilizing a preferred embodiment.

Referring to FIG. 1, a central server 100 is connected to devices 106 and 108 by an internet protocol (IP) based network, carried over a series of connections, at least one of which is a wireless connection. For example, the server 100 has a connection allowing IP based communications to a cellular network 102 using connection 101. The cellular network is connected to devices 106 and 108 by wide area wireless links 104 and 103 respectively, allowing for IP based communications between the devices (106 and 108) and the server 100.

Devices 106, 108 can be considered "client(s)" of the server 100. The clients 106, 108 and server 100 provide processing, storage, and input/output devices for executing wireless system protocols, interfaces, and application level programs according to the invention. Client devices 106, 108 can also be linked through various communications networks to other computing devices, including other client devices/processes and other server computer(s). Communications network(s) providing the connection 101 can typically be part of a remote access network, a global network (e.g., the Internet), a worldwide collection of computers, Local area or Wide area networks, and gateways that currently use respective protocols (TCP/IP, 3G Wireless, Bluetooth, etc.). Other electronic device/computer network architectures are suitable.

The internal structure of devices 106, 108 or server 100 includes one or more data processors (not shown in detail) that are well known in the art to include a system bus for data transfer among the other internal components of a computer system (e.g., processor, disk storage, memory, input/output ports, network ports, etc.). Attached to the bus are other input/output devices (e.g., keyboard, mouse, displays, printers, speakers, network interfaces, etc.). Network interfaces allow the computer to connect to various other devices attached to a network. Memory provides volatile storage for computer software instructions and data used to implement an embodiment of the present invention (e.g., applications programs and the like). Disk storage can provide non-volatile storage for computer software instructions and data used to implement an embodiment of the present invention.

In one embodiment, the invention may include a computer program product including a computer readable medium (e.g., a removable storage medium such as one or more DVD-ROM's, CD-ROM's, diskettes, tapes, etc.) that provides at least a portion of the software instructions for the invention system. Computer program product can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention.

More particularly, a given device 106, 108 uses a short range wireless link 107 such as a Bluetooth (IEEE802.15.1) or Wi-Fi (IEEE802.11) link to detect the presence of other devices such as device 108, and uses the wide area wireless network connections 103, 104 such as IS-2000, WCDMA, GPRS, EDGE, LTE, Wi-Max (IEEE802.16), or the like to perform communications to central server 100, and to perform the actual substantive communications between the wireless devices 106 and 108. Device 108 typically uses the short range wireless link 107 and wide area wireless link 103 in a similar manner to locate and initiate communicate with device 106. One distinction relative to prior art is that the short range wireless 107 is only used for the detection process, or to advertise a device's presence. In this embodiment, specific information called "wireless identifier" or simply "identify" (described in more detail below) is passed between devices 106 and 108 over the short range link 107. By transmitting a wireless identifier using the short range Wi-Fi, Bluetooth or other short range wireless link 107 and receiving wireless identifiers from other devices, this short range wireless link 107 will allow for a proximity detection process.

The support for IP based networking is standard for WWAN or 3G connections such as 1xEV-DO or HSPA, and as a result, communication between one device to another using the WWAN is currently supported in many devices with no modification. The use of simple detection of one or more identifiers requires significantly less resources in a phone than performing a complete peer to peer based communication network protocol, which accommodates dynamic configuration of nodes being added and dropped continuously. It is noted that the IP address on the WWAN interface is not location dependent in the present embodiment, but is addressing approaches are location dependent when true Peer to Peer topologies are used. The present embodiment has the advantage that communication between two devices may continue after the devices have left proximity of each other, but in the same manner as they had been communicating previously. As a result, a user who detects a short range transmission of an identifier, then begins a conversation or some other interaction with that device via the wireless wide area network may continue that conversation even in the case where the two devices move out of the proximity of the each other, and are no longer within the reception range of the short range wireless communication protocol. Further, since it is contemplated that the wireless identifiers transmitted on the short range wireless link from the devices would occasionally change, for security reasons, the present embodiment has the advantage that ongoing communications between mobile devices will not be interrupted despite a change in one of the device's identifier. In the case where the identifier is a MAC address of the short range wireless network adapter for one of the devices, it is not otherwise possible to change this address and easily maintain on going communications in a true peer to peer topology.

Figure 2:
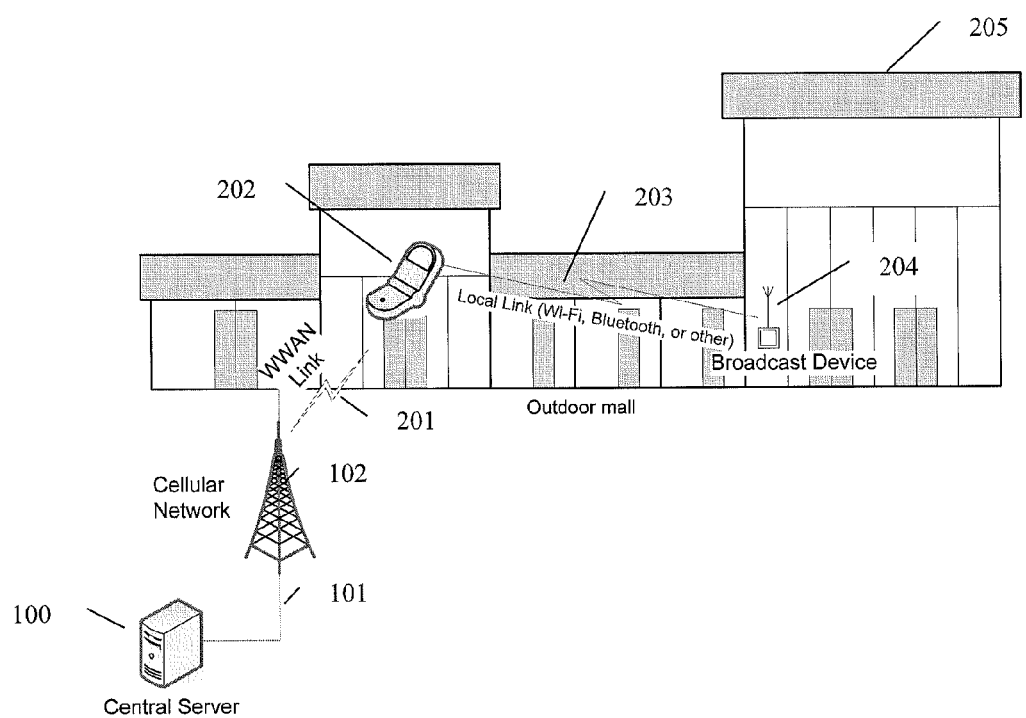
FIG. 2 is a block diagram of a fixed broadcast device and a mobile device.

Referring to FIG. 2, central server 100 is connected to the cellular network 101, and is able to communicate information to and from wireless device 202 using a wide area wireless link such as IS-2000, WCDMA, GPRS, EDGE, LTE, Wi-Max (IEEE802.16), or the like within structure 205. Device 204 does not have a wide area wireless or cellular link, but transmits identifying information using short range wireless link 203. Device 202 is capable of receiving the indentifying information and requesting information related to that device from server 100.

An example of an application using this infrastructure follows. The device 204 will simply broadcast an identifier, with no WWAN connection but may facilitate advertising or local information. For instance, an account associated with one or more identifiers may belong to a museum. As a museum patron walks to an exhibit, the patron's device 202 will receive an identifier sent from museum broadcast device 204 operated by the museum. The patron device 202 passes the identifier or museum device 204 to the central server 100, which in-turn recognizes it as being associated with that exhibit within that museum and passes relevant information back to the user's device 202. A distinguishing feature of this approach relative to prior art is that the patron device 202 in this example may move out of proximity of broadcast device 204, yet continue to view the content being provided by the server 100 related to the detected broadcast device 204. Content may include text, pictures, web pages, application software such as games, informative display applications, or other content such as audio or video to be offered to the user's device as well. Other examples might include electronic coupons (such as in a grocery store), menus or special offers in a restaurant.

Figure 3:
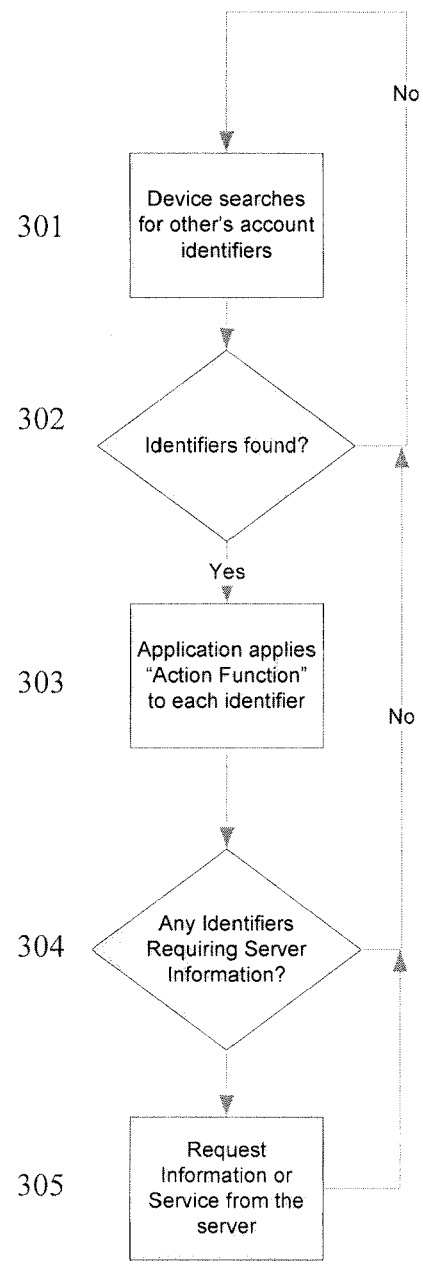
FIG. 3 is a flow diagram of the operation of an application on the mobile devices.

FIG. 3 is a block diagram with further detail of this operation. A device 106, 108, or 202 after performing a search (FIG. 3, step 301) for identifiers on the WPAN or WLAN, will subsequently use the WWAN link to communicate with the central server 100. If the device does not find identifiers 302 it will either continue to search, or search at a later time 301. If identifiers are found in 302, the device may employ an action function 303, which would act as a filter that determines which of the detected identifiers should be passed to the server. This function may instead be omitted and all identifiers passed to the server 100. The idealized effect of the action function would be to reduce the number of requests to the server by not re-requesting recently requested identifiers which have already been passed to the server, for some period of time. In step 304, if no identifiers require server information, searching is continued in step 301.

Assuming there are identifiers which are new to the device, the device will pass along a list of currently detected identifiers and request 305 that the server return information related to any other local device. The server will return the information related to any identifier that meets certain policy requirements. For instance, information is returned which is 1) relevant to that device, and 2) that the device is authorized to receive.

As an example of the overall process, a detected identifier may be relevant to the receiving device if the user associated with the detected identifier is listed in a "friends list" for the owner of the receiving device. If the identifiers for the individuals within the friends list have been passed to the device, the action function 303 may make this determination. In the preferred embodiment, the server would determine the identity and the relevance of the detected identifiers, and the action function 303 would work to reduce frequency of re-requests to the server. FIG. 7 describes an example of how to use this for messaging associated with the device and server interaction during the detection and identifier inquiry process, with a more detailed explanation to follow.

To enable server 100 to associate an identifier with an entity, each device or entity (such as the museum) associated with an identifier has an account on server 100 or a related server as is common in information technology. The account is associated with the entity and the device and the current identifier.

As used herein, an "entity" may be a legal entity, such as an individual person or a business.

An "object" is intended to include a physical thing, such as a product that is being offered for sale, and may include a tangible article or intangible such as an electronic music or video file or photograph.

There is various information associated with each account. An example data record for an account is shown in FIG. 11. When the account is associated with an individual or (other entity), there may be personal information such as the individual's name, contact information, information regarding allowed communication, such as chat or IM, links to their other social networking services, and the like. When the account is associated with a broadcast device 204 the account may contain content to be displayed to the detecting device 202. By utilizing the central server 100, broadcast devices may be tied to a location or product thereby providing relevant information about the location such as in the museum tour example previously discussed. In this situation, the content delivered to device 202 may be informative information about an exhibit including pictures, text, audio, or video and the like. In the case of a broadcast device being in a supermarket and near a specific product, advertisement or discounts with electronic coupons may be stored in the account and provided to device 202.

There can also be policy based permissions associated with each account and applied to any information associated with that account. The stored policy permissions can be used to determine what information and under which situations information may be disclosed to another device or user associated with another account. For example, the entity (person in this case) associated with device 202 may have set a policy in their account to not receive any unsolicited information from a broadcast device so as to not be disturbed. However, the person associated with 202 may see the broadcast device and a sign stating a discount is available, and provide input to their device to request any broadcast information on a one time exception basis. The messaging associated with an example mobile and broadcast device process will be described in more detail to follow associated with FIG. 9.

As already mentioned above, in step 301 of FIG. 3, each device performs a search function looking for identifiers sent from other devices utilizing a short range wireless capability. The following describes the process of devices detecting identifiers from other devices in more detail.

The identifiers themselves may be a hardware address such as the MAC address of the wireless device, or they may be another label such as the SSID for a IEEE802.11 device, or the device name for a Bluetooth device. Referring to FIG. 4, in the case where a Bluetooth wireless personal area network device is utilized, a first device 401 transmits an inquiry (ID_Packet) message 404, and any proximal Bluetooth devices 402, 403 respond with messages identifying the MAC address, called BD_ADDR in IEEE802.15.1 of each device using a message referred to as an "Inquiry Response" FHS message 405 containing the BD_ADDR or Bluetooth device address of the detected device. In the Bluetooth standard all devices 402, 403 are required to respond in this manner assuming they are enabled to be discoverable. To enable this, an application on the mobile device ensures the Bluetooth device is set to discoverable mode. Device 1 (401) will attempt to locate Devices on different channels by scanning the channels and transmitting multiple Inquiry (ID_Packet) messages. Such an example is shown with inquiry exchange 406 and 407 to discover Device N (403).

In one embodiment the BD_ADDR or MAC address of the Bluetooth device can be used as the Identifier and no further Bluetooth interaction is required until the next scan process is performed.

In another embodiment, the Bluetooth "Device Name" is used as the identifier. FIG. 5 shows the process of a first device "Device 1" (501) determining another Bluetooth enabled device's (502) Bluetooth Device Name. Following the device discovery process completion from FIG. 4, Device 1 501 sends a Page message 503 to another device (Device L 502). Message 504 is sent in response to create a temporary Asynchronous Connectionless Link (ACL) to be established between Device 1 501 and Device L 502, without an explicit connection request. Not having an explicit connection request indications the Entity associated with Device L would not have to provide explicit approval for a connection from their user input on the device, as would be the case if other services were requested from the device such as might be the case with a wireless headset or remotely connected GPS receiver to a phone. An ACL connection allows link management packets to be exchanged, and following interchanges of messages 505 and 506 to determine features of the devices, a temporary connection is established between the two devices. A name request message (507) is then sent by Device 1 to Device L, and Device L responds with at least one LMS_name_res message 508 containing the Bluetooth device name of Device L 502. If the name is longer than that allowed within the LMS_name_res message, additional messages follow to allow for the entire name to be delivered. Finally the connection is ended with message 509, LMP_detach.

The transmitted identifiers associated with any given device are only known to the central server and the device transmitting the identifiers. These identifiers may change from time to time, making a user's or a device's identity anonymous over time. The central server and any particular device must be coordinated such that the identifier and any device transmitting it, remains identifiable by the central server. This process is coordinated between the wireless device, and the central server utilizing the WWAN or cellular data link, carrying messaging between them and using an identifier manager 1303 to maintain a list of device identifiers 1302 in a central but secure location. This is shown in more detail in FIG. 13.

Referring to FIG. 6, an example of using on IEEE802.11 link as the short range wireless capability is discussed. Generally, Wi-Fi devices operation in a so-called infrastructure mode which utilizes a BSS or basic service set. One component of a infrastructure network based wireless LAN is the use of a central access point or AP. In a mobile network the use of a central AP is not practical, as only the AP transmits an identifier, which does not meet the requirements of the preferred embodiment. The second topology for Wi-Fi networks is the so-called Ad-Hoc mode of operations, referred to as an independent basic service set or IBSS. In an IBSS all devices participating or advertising their interest in participating in an ad-hoc network transmit identifiers called beacons. These beacons contain the MAC address of the transmitting network adapter, the basic service set identifier (BSSID), and ad-hoc network name or service set identity (SSID). The BSSID in a typical ad-hoc network is generated by the first station to enter the BSSID and is locally administered, typically a randomly generated 48 bit number matching the format of a MAC address. In an ad-hoc network, each device 601, 602, 603 participating or desiring to participate transmits a beacon. There are several embodiments related using the IBSS beacons and the identifiers. First the identifier may be used as the MAC address of the station device or network adapter, and one or both the BSSID and the SSID may be used to indicate these particular beacons are associated with a service. In other embodiments, one or more of the BSSID and the SSID may be used as the identifier. In any of the embodiments for delivery of the identifier in an IBSS beacon, it is possible to coordinate the change of those identifiers with the server 100. As the MAC address is always broadcast in any operation of a Bluetooth or Wi-FI link, the use of a MAC address as an identifier provides for an additional level of security for the device 601, 602, 603, when identifier is changed from time to time as devices may be detected and identities tracked using a constant MAC address. In the preferred embodiment, where the MAC address is used for the identifier, all the devices participating would likely have the same network name and SSID to aid in the identification of the device as being enabled, although not necessarily required. Examples using an 802.11 network in ad-hoc mode transmitting beacons are showed as messages 604, 605, and 606.

Chat Example Between Two Mobile Devices

FIG. 7 shows an example of a message flow diagram for an embodiment where an individual is in a library for example, and a friend arrives. The individual is notified by their device receiving an identifier that their friend is present and they enter a chat session. Each person has a device (FIG. 1, 106 and 108 respectively) that implements the preferred embodiments described above. The first individual associated with Device 1 (702) referred to as Entity 1 (EI1) performs a detection process as described in FIGS. 4, 5, and 6 previously (step 704). The device identifier associated with Device 2 (703), DI2 is thereby detected. Device 1 (702) then transmits an inquiry message 705 using the WWAN (cellular data link such as GPRS, EDGE, 1xEV-DO, IS-2000, Wi-Max, LTE, or the like) to the server 701 inquiring if information related to the account and entity associated with DI2 is relevant, and available to the entity EI1 associated with Device 1 (702). The server 701 retrieves the account information related to EI1 and determines that EI2 is listed in a friends list in the account associated with EI1 and that EI1 should be notified when EI2 is detected. Next the server retrieves the account information associated with EI2 and determines that EI1 is on a list of entities which are allowed to be notified of EI2 being present and personal information such as the name of the individual, their phone number and the like. The server having determined that EI1 wants to be notified and is allowed to be notified responds in Step 706 to Device 1 (702) with a message indicating the DI2 is relevant to EI1 and including information such as Entity Identifier EI2 and associated details. A user application on Device 1 (702) notifies the user that the entity associated with Device 2 is in proximity in step 707. The user of Device 1 provides input to the device directing it to request a chat session with the entity associated with Device 2 (703), and a message 708 is sent the server 701 commanding "send 'Hello' to EI2". The server acknowledges reception of the message with a "ACK" message 709, in return. Next server 701 sends "Request Chat: 'Hello' from EI1" to Device 2 703. The user of Device 2 accepts the chat and returns a message "I'm by the front door" with message 711, sending it to the server to be relayed to device 1 (702).

E-Commerce Between Two Mobile Devices

FIGS. 8A and 8B show a message flow diagram for an embodiment where two individuals are performing a financial transaction on the street (for example, a customer and a street vendor). Each has a device (FIG. 1, 106 and 108 respectively) enabled with the preferred embodiments described above. In this example, an individual's device would see a vendor and the vendor's device (enabled with the current invention) would notify them that the vendor was also enabled with a device supporting the identifier search and other protocols described above, as well as being capable of electronic payments. These steps are performed in the following way. In step 804 the customer's device 802 (Device 1) performs an identifier search process as previously described, and detects a device identifier 2 (DI2) sent from Device 2 (803) belonging to the merchant. Device 1 will send a message to the server 801 (also represented by 100 in FIG. 1) using the WWAN (cellular data link such as GPRS, EDGE, 1xEV-DO, IS-2000, Wi-Max, LTE, or the like) 104 requesting information related to DI2 and its relevance to the entity related to device 1 802. The server 801 then determines the relevance of DI2 based on the account properties stored in the account associated with the consumer Device 1. In this case, the account settings only allow messages from or notifications of entities on a friends list stored in the account record (represented in FIG. 10) associated with the consumer. Server 801 responds to device 802 with "no" indicating that DI2 is not relevant to the Consumer.

The customer, having an account enabled with electronic payments, and wanting an item the vendor has, would press a button or make other input to his phone (or other device) which would indicate they would like to make a purchase and pay using their device (808). In this case the input selection would be "search for merchants." The customer's device would then send a message (809) to the central server directing the server to perform a one time search for merchants, despite the current account settings. In one embodiment, the server would then direct the consumer's device 802 to initiate another search (809). Other embodiments may not include the server commanding Device 1 (802) to perform the search, but rather the search may be performed automatically, or use results from a recent search. In Step 811, Device 1 (802) performs another search and detects the identifier from Device 2 (803), DI2. Device 1 then sends a message 812 to the server again requesting information for all relevant devices detected, which will include at least DI2. In Step 813 the server, having received the request and list including DI2, looks up account information associated with DI2 and determines that the associated entity is a merchant. As the settings of the account associated Device 1 now allow for the notification of the user when a merchant is detected in proximity, DI2 is determined to be relevant to Device 1 and the Entity 1 (EI1) should be notified. The server then sends a message 814 to Device 1 (802) stating merchant services are available in proximity with a list of available merchant's information including information related to the entity (EI2). The user of device 1, Entity 1 (EI1) then provides input in step 815, (pressing a soft key on a touch screen for instance), selecting the specific merchant EI2 to engage with in a transaction. Device 1 (802) will then send a message (816) to the server requesting a transaction with EI2 associated with Device 2 (803). The server (801) will then respond in this embodiment with a message 817 to Device 1 confirming receipt of the requested transaction and providing information to allow the EI1 associated with Device 1 to independently confirm the identity of EI2 associated with Device 2 (803). In this embodiment the identifying information can include the name of the merchant, the merchant's logo, a picture of the vendor, or their mobile shopping cart. In other embodiments, the picture may be of a specific unattended vending machine in the location it is currently operating. It may also include other information such as the address of the merchant in cases where a fixed store location is provided. As this particular merchant in this example is a street vendor, an address may not be used. GPS information stored in the account associated with Device 2 may be used as further confirmation in some instances. However, in this example, GPS coordinates are not be available on Device 2 due to lack of capability, or Device 2 being indoors and without sufficient signal to determine a location. Further GPS information from Device 1 (802) may be used to provide further confirmation information. In this embodiment the photograph sent in message 817 shows a picture of the particular merchant and also his city issued business license in text and as a picture of where it is displayed on the cart. The consumer entity EI1 provides input to Device 1 in step 818 confirming the identity of EI2, the merchant entity associated with Device 2 (803). Device 1 then sends a message 819 to the server 801 confirming the identity of the merchant.

Server 801 then sends a message 820 to the merchant's device 803 notifying them of the request for a transaction with EI1. Device 2 (803) then indicates to the merchant that a customer with the capability and desire to pay electronically is in proximity. In step 821 the customer associated with Device 1 (802) places an order with the merchant associated with Device 2 (803) and a list of products to be purchased is generated and the merchant provides input to Device 2 (803) to proceed with a electronic transaction. In step 822 Device 2 performs a scan of identifiers and DI1 associated with device 1 (802) and the Consumer is detected. A request is sent to the server 801 with a list of identifiers which were detected to determine if any of them are relevant to the merchant. Note that while the merchant device 803, (and the merchant) have now been notified of the desire for EI1 to enter a transaction, they do not necessarily know the identifier for EI1 yet. In other embodiments, the identifier associated with EI1 and Device 1 (802) may be sent in message 819, and a confirmation that this identifier is detected during the scan process 821 may be performed at the device. In the preferred embodiment, further security may be provided by the having the server perform this function independently. The server performs this confirmation in step 824 may matching the device 1 identifier DI1 with the information stored in the account associated with Entity 1 (EI1) also referred to as the Consumer.

The server than generates a message 825 to Device 2 (803) indicating that EI1 is relevant, and the transaction participant is present. The message in the preferred embodiment can also include a picture of the Consumer. Additionally, the message could also include other pictures of other individuals allowed to use this device for purchases. If more than one identifier was detected in step 822 and matched in step 824 to entities having requested transactions previously which are pending for that merchant, a list of information for each entity involved with a pending transaction request can be provided in message 825. The merchant then selects the correct consumer using the picture of that consumer, confirming the identity of the part to the transaction in step 826. The consumer information provided in message 825 in another embodiment may simply be the name of the customer and the merchant may either ask their name, or request identification such as a driver's license. In the preferred embodiment, where a picture is passed in message 825, it is not necessary that the individual's name be passed to the merchant for the merchant to be able to provide confirmation of the identity of the Consumer thus providing a level of anonymity to the transaction such as may be present when cash is used.

Following the confirmation by the merchant of the identity of the Consumer participating in the current transaction in step 826, Device 2 sends a message 827 to the server confirming the identity of the Consumer as Entity 1 (E1), and with information required for the transaction including the list of products to be purchased, their prices, the total price, and a request to charge E1 this total amount. Server 801 then confirms receipt of this message in step 828. The server then sends a message 829 to Device 1 requesting the Consumer to confirm the list of goods to be purchased and the total price to be paid. In step 830, the Consumer (Entity 1) reviews the list and amount to be paid and provides input to device 1 confirming the accuracy of the information and they the authorizing the server to pay. In step 832 the server charges E1 utilizing stored preferred charge card information, stored credit, or other payment method such as a PalPal™ user name (PayPal is a trademark of Ebay, Inc.) and password stored in the account associated with E1, and charges the consumer. In the case where a stored credit is used, the Consumer's account can be debited, and the credits not applied to the merchants account until a later step. In the case of a credit card, or PalPal™ transaction, the server provides payment to E2 (the merchant) utilizing information stored in the account associated with Device 2. The server then indicates payment is made to the merchant, and instructing the merchant to deliver the goods with message 833. E2 (the Merchant) then provides the goods and provides input to Device 2 that the goods have been delivered in step 834. Message 835 is generated by Device 2 (803) to the server confirming product delivery, and acknowledging the receipt of the payment confirmation message 833. The server can then send message 836 requesting the Consumer to confirm they received the goods. If a confirmation is not received in response to this request, this information may later be used to settle any dispute that might arise. In step 837 the consumer confirms receipt of the products, and message 838 is generated to the server confirming the receipt of goods by the consumer. In Step 839 the server concludes the transaction by completing any steps required to credit the Merchant with the payment amount from the Consumer, if required. The server then sends a message 840 to the Merchant indication the transaction is complete, which is acknowledges in message 841. The Consumer is notified of the completed transaction with message 842, which is acknowledged with message 843.

Finally, the transaction details may be stored by the server, or sent to a thirdly party server for tracking spending habits of that account holder, or customers of that merchant allowing the merchant to track that specific customer's behavior and cater to them in the future with various specials delivered via email, or during their next visit via their device in the form of an electronic coupon. This process can be performed with a goal to help the merchant expose the customer to other products or services the merchant believes the customer might find desirable.

The present invention can be extended to facilitate other types of transactions as well. In one specific application, consider use of the invention to facilitate a transaction such as the rental of an automobile. A well known business called ZipCar™, presently operating in several major urban areas in the United States, makes available a fleet of vehicles for shared use by their club members who pay a monthly fee plus a per use charge. Using the present invention, the club member would have a wireless device that serves as the "Consumer device" (Device 1) and the ZipCar vehicle would be equipped with a wireless device serving as the "Merchant" device (Device 2). The consumer would walk up to an available ZipCar vehicle and, using their wireless device, start an initial exchange of identifiers with the desired Merchant device, for example, using the short range local wireless network. The Consumer device and/or Merchant device would send a message to an application running on the Server requesting that a person associated with an account for the Consumer be granted access to a specific vehicle (e.g., an "object") that is in the vicinity of and associated with the Merchant device. A set of confirmatory messages (such as to exchange access codes, to confirm the location of the vehicle, the per-use fee due, and payment for the same, etc.), are then typically also exchanged between the Consumer and the Merchant device with the assistance of the Server and the long range wireless network. Upon confirmation of the necessary transaction information, the Server sends a message to the Merchant device to unlock the vehicle requested (which may be sent over the second long range wireless network or a yet another network, such as a satellite network).

Example of a Mobile Device and a Broadcast Device.

FIG. 9 shows a message flow diagram for an embodiment where an individual is in the presence of a broadcast device, such as for the museum example of FIG. 2. As with FIG. 2, the individual device 202 and the broadcast device 204 are present and enabled. In this example, an individual 902 is in a grocery store and their device 902 (Device 1) performs a scan for identifiers in step 904, as described previously. DI2 is detected having been transmitted from device 2 (903). Device 1 (902) sends a message to server 901 inquiring if DI2 is relevant to the entity associated with Device 1 and if the information associated with that device identifier (DI2) is available to be returned. In step 906, the server retrieves the accounts associated with both DI2 and Device 1 (EI1). The server detects that the entity associated with DI2 is an advertisement company, and that this device is a broadcast device only, and that there is an electronic coupon available for download to Device 1, and multimedia content available to be played if desired. Additionally, the account settings associated with EI1 allow for the notification of broadcast devices in proximity.

Server 901 then transmits a Response message 907 indicated the presence of the detected device and the content available. The device 902 requests input from the entity associated with the device 901 for permission to download the coupon, and the availability to play content such as video about how to prepare a recipe using the vendors product. In this case the individual associated with Device 1 accepts the content, and a message 909 is sent to the server accepting the content. Response message 910 begins the delivery of the content.

As previously mentioned, several key distinctions of this embodiment include that the user of device 902 may walk away out of range form the broadcast device 903 and continue to receive the content using their cellular link, or may choose to play the content at a later time having stored the detected like in a favorites list. Additionally, the content stored in the account associated with the broadcast device 2 (903) is relevant to the placement of the device and the products near it. Further, as the content is stored in the server 901 rather than in the broadcast device 903, the content may be updated, modified, or deleted at anytime. For example the server 901 knowing that the consumer has never been detected previously, may customize the electronic coupon to provide a deeper discount than a regularly detected consumer. In the case where the devices are used for electronic commerce as in FIG. 8, knowledge of the user's past purchases may be used to induce the consumer to try a new product. Alternatively if the consumer is a regular purchaser a loyalty program may provide a coupon upon a particular number of repeated purchases.

FIG. 10 is a processing flow chart performed by the server receiving a request from a device inquiring about the relevant and availability of information associated with detected device identifiers. In step 1001 the server is waiting for a request from a device. When a request is received in decision 1002, step 1003 is performed. In this step the account information associated with the requesting device is retrieved. In step 1004 the information associated with the accounts for each of the detected device identifiers is retrieved. In step 1005 the server performs a matching process between the policies of the requesting account and each of the policies for each account associated with each detected device identifier. In step 1006 the information related to the matched policies for the associated entities will be sent to the requesting mobile device.

Just as in the previous example of an identifier being deemed relevant to a user based on a friends list, permission for disclosing a device's presence may require being on a friends list as well. For example, when a server receives an inquiry from a device with a list of identifiers, it may only respond with information for users associated with the identifiers that are on that device's friends list, and on each of the individual's friend lists as well. These friends' lists and policies can be stored within a user account which allows for disclosure of a user's presence only to individuals on this list, such as described in FIG. 11 (to be described below.)

It is contemplated that the permissions not be an "all or nothing" decision, but that different classes of information may be assigned different permissions and mechanisms. An example of this might be a user's presence, identity, and cart services being made available to only one set of other accounts (or users), while the presence of an anonymous individual being made available to anyone, but with other classes services available such as multi-player games being treated differently. Additionally multiple contacts may be included in the account, each given customized permissions. An example can be that any user may be notified of an anonymous user or other information based on additional policies.

As only the server contains personal information, and performs the association of an account with a particular identifier, it can inherently enforce the security of the policies as a distinct advantage relative to true peer to peer services. In this way, the central server controls the process of passing information related to an account to a particular requesting device.

FIG. 11 shows an example account record to be associated with an entity and at least one device. The columns of the account record can consist of a Record Index which will be used to described the account, a Field which is a descriptive name for the contents stored in the record, and a Field Information Group Disclosure Policy Assignment List (PAL). The PAL provides rules for the disclosure of the information in the associated row in the Field column. The following list are possible PAL entries:

| | |
|---|---|
| ALL: | may be disclosed to any requesting entity |
| EXPLICIT APPROVAL: | the Entity associated with the account must provide input approving the disclosure of the information |
| NONE: | Do not disclose this information to any other entity |
| M: | where M is a integer from 1 to N indicating a Information Group Disclosure Policy which may consist of a list of contacts, friends, groups, characteristics, and the like. |

Most of the fields in FIG. 11 are self explanatory and typical in the industry such as the account number, however a few fields are worth a clarifying discussion. The Device identifier is in record index 2, with a Identifier type in record 4. The identifier type can define what type of identifier the device associated with this account would use. Record index 10 is the Entity Type Field. This describes is the entity is a Merchant, Individual, or if the device associated with this account is a broadcast only device.

Referring now to FIG. 12 a timing map reference for scanning times and dormant times for devices is shown. In one embodiment, it is desired that the power consumption and scan timing for the devices in a cellular network be reduced. Since the server and the WWAN is involved with all mobile devices, coordination of the broadcasting periods and the searching periods for the short range radios is possible. This can be based on a common reference time such as that provided by most cellular systems, any the time of day clocks inherently within mobile devices. This allows for reduced power consumption and other resource consumption in the devices. If no coordination is achieved, then the short range receivers in each device must be scanning for transmitted identifiers much more often and for longer durations. Utilizing a common timing base, and the central server to notify the devices of a coordination approach for "active times" and "non-active times" and will allow for the devices to minimize the power consumption in the transmission of and scanning for identifiers. This approach also allows for synchronizing the update of each device's identifier (as described previously) to enhance anonymity and security, coordinated with the central server. The "non-active times" may be used as "boundaries" over which the changing identifiers may be updated. This update may be based on either direct communication with the server, or rule and algorithm based updates previously coordinated with the central server so as to minimize server messaging, but allowing the updates to remain synchronized to the server such that the device and the server are always associating the same identifier between them.

As will be recognized by an individual skilled in the area of information technology, the concept of a central server may well be implemented as a collection of servers to allow for load balancing, redundancy, and the like in a manor common to the information technology industry.

FIG. 13 shows a diagram of functional blocks associated with the management of dynamically assigned device identifiers. The Server 1301 has an application agent called an Identifier Manager (1303) which has access to a pool of device identifiers (1302). The Identifier Manager monitors timing information and determines when it is time to update a particular device's identifier. This time may be a regular interval, or a random generated time period by an algorithm such as a pseudo-random sequence generator, or a combination of both. When it is time to update a device identifier, Manager 1303 retrieves a new identifier form the pool 1302. The pool of identifiers may be a list or range of identifiers, or generated algorithmically. The new identifier is stored in the account associated with the entity determined to require updating and a message sent to the device 1305 associated with that account commanding it to update its device identifier with the new one. This message is sent over the WWAN Data network 1304 such as IS-2000, HSPA, GPRS, IS-95, Edge, Wi-Max, and the like. All devices 1305 to 1307 will eventually all be updated in a similar manner. This update process does not disrupt ongoing communication and interaction between devices despite the update as the communications are preformed based on the identity of the entities following the detection of the device identifiers which are no longer utilized. This unique capability allows for the updating process to be implemented and not impact the applications being utilized concurrently.

Other Example Applications Utilizing Still Other Embodiments Follow Below.

Requiring the brokering of the communication via a central server can also allow a mobile device to receive information associated with a "broadcast only" device, such as in the museum example discussed previously. This is important, as such broadcast devices can enable a vast set of new applications built upon the infrastructure developed in this application, beyond the museum application. Some of these applications may involve an electronic commerce aspect, for example.

Electronic Commerce Applications

Ecommerce between a fixed broadcast device and a mobile device

Football Stadium Example

An embodiment of a transaction model, enabled by the infrastructure described above can be an event such as a concert, or sporting event (particularly when it is an indoor venue where no GPS is available). A number of the broadcast only devices are placed through out the seating areas. The devices are very short range, and only transmit intermittently and as a result may be battery powered and to remain active over a very long time period. Each device can be placed in a known location, in a predicable manner.

An attendee at the event has his or her device enabled with the identifier protocol and other embodiments described above. The device detects a broadcast device, and interacts over the internet with the server via the WWAN connection (as already described above). The server receives an indication of the broadcast device's identifier and the identifier of the account associated with the device which detected the broadcast device. The server retrieves content associated with the service provider's account and provide that content to the application on the requesting mobile device. The content may indicate that the venue has a product delivery service. The user may then press an indication on their device that they would like to see a menu or list of items for sale from the merchant(s) in the venue. The application on the user's device would then allow them to see a menu, for instance, and select items to purchase. The user then would be asked to confirm the purchase. The server would then indicate to the merchant that a user located near a specific broadcast device has ordered something. In this case, it is expected that a delivery fee could also be charged for the enhanced service. The server would facilitate the purchasing of the goods or services from the merchant and payment from customer's account, and provide confirmation to each. Such confirmation can include an electronic receipt provided to the customer, for user upon arrival of the delivery person of the good or service. The customer can then select an indication on their device confirming receipt of the good or service via the mobile device, thereby completing the transfer of funds and the transition. Optionally, the delivery person of the good or service may have an enabled mobile device as well. In this case the identifiers may be detected by the customer's device and reported to the server to confirm that the provider's delivery person was present. Further, the delivery person's device can be able to detect the broadcast device's identifier and reported to the server confirming the delivery person was in the correct area independently. Even further proximity confirmation may be achieved by the customer's device's transmitted identifier being detected by the delivery person's device and reported to the central server further confirming the physical proximity of the parties involved in the transaction. Upon arrival of the delivery person, the customer may be notified that the delivery person is looking for them, and has arrived. These cross confirmations can allow for the central server evidence to justify payments both in completed transactions and in disputed or failed transactions. Further, the delivery person may receive a picture of the requesting customer assisting to identify the customer to whom the food is to be delivered. Once the customer is found, the delivery person can confirm the delivery of the good or service to the customer via the user input on their mobile device, and that confirmation being reported to the central server. The customer can have the option to report confirmation or denial of the reception of the product or service as well, as in the last example.

In another embodiment, the merchant device may be fixed, but have an internet connection (wireless or otherwise). Further, in some embodiments, the merchant may be an automated device such as a vending machine. In such a model, a customer may use their enabled cell phone to purchase an item such as a beverage from the machine without the need to insert currency into the machine. This can be accomplished by the customer's cell phone detecting the vending machine transmission of the identifier or visa-versa. Following the detection of either the customer's identifier by the vending machine, or the customer detecting the vending machine identifier, the respective device notifies the server, which in turn provides notification (assuming the account settings allow for notification) to the potential customer via their device. Assuming the customer selects to purchase an item from the vending machine using their account associated with their device, the customer may be presented a menu as in the example above. The customer may further be presented information to ensure the identity of the vending machine, such as a description of the machine, a machine identification number, or a (most likely) picture of the machine where it is located. The customer can then confirm this is the machine they are interfacing with, and select to pay via their account. The customer may in one model select the item to dispense by input to their phone, or they may simply select to provide payment to the machine allowing them to make the selection manually as is the typical mode of operation today. The vending machine can then interact with the server via its own internet connection, and participate in the transaction in a manner similar to the mode described above allowing for step by step confirmation as previously described.

Electronic Opinion Polling, Tied to a Known Location.

In a much simpler example, such a capability might be used to tie a survey to a known location in such a way as to provide an e-coupon to the survey taker on their device in return for completion of the survey. Alternatively, this type of interaction can enable a very large crowd to interact with a JumboTron like display to provide input to polls or to participate in group activities. Users at different locations in a audience may form teams and interact with other teams for group activities.

Feature Summary of Preferred Embodiments

1. In a first embodiment:
   One device is transmitting a wireless identifier using a wireless protocol capable of peer to peer communication;
   The wireless identifier being associated with a specific account on a server connected to the internet;
   A second device receiving the wireless identifier
   The second device capable of communicating with the server over an internet connection;
   The second device requesting information from the service associated with the first identifier
      The second device having a second identifier associated with a second account on the server; and/or
      The server providing different amounts of information related to the first account based on the parameters associated with one or both of the first and second accounts
   The identifiers associated with the accounts being updated such that the identifiers would no longer be recognized as being associated with specific accounts without past or current interaction with the server;
   Using one or more of Cellular network timing information, and information form the central server to coordinate the broadcast and search times amongst the devices. (to reduce power and resource consumption); and/or
   Data necessary to engage in an E-commerce transaction may be exchanged as well such as the identity verification such as via a picture and/or mutual identifier detection.

2. In a second embodiment,
   A device is capable of operating two wireless protocols simultaneously, utilizing a first wireless protocol in the device to detect the proximity of another wireless device and using the second wireless protocol to communicate with a remote server, where:
      a. One or more of the devices are mobile devices;
      b. Where the first wireless protocol is a local, or personal area network wireless protocol such as 802.11, Bluetooth, UWB or other local connectivity protocol;
      c. Where the first wireless capability used for detecting the presence of another device, or advertising the presence or a device;
      d. Utilizing a wireless wide area data link from one or more of the wireless devices to, optionally:
         i. Connect to a central server;
         ii. Perform user authorization functions;
         iii. Perform download of information associated with account identifiers utilizing the short range wireless capability;
         iv. Request forwarding of messages/packets to the other active account;
      e. Utilizing the messaging with a mobile proximity based social networking capability; and optionally,
         i. The messaging being performed via the WWAN; and/or
      f. The server providing a centrally assigned user identity, with relationship brokering or identification capability.

3. In another embodiment,
   A central serving capability is provided to mobile devices utilizing a wireless WAN connection to provide and exchange information between one or more application on one or more wireless devices and the central server where
      the information passed to the central server is collected by one wireless device from another wireless device via a separate local wireless reception from the other wireless device;
      the separate local wireless reception from the second wireless device contains information directly assigned by, derived from, or known to the central server associated with the identity of the second wireless device;
      this identity is related to certain information and preferences of an account holder associated with an application operating on the second wireless device;
      the application is operating on both wireless devices;
      the application operating on the first device also provides its own identifying information to the central server as well as detected identifiers from devices with applications on them;
      The central server contains account information registered to the applications running on each wireless device;
      The preferences associated with the account information also contain policies related to the disclosure of one account's stored information to other accounts and hence to their application on their devices;
      These policies including a classification of other accounts each classification having different policies some of these policies being one of:
      no not allow notification of my presence
      allow notification of my presence
      disclose my name/do not disclose my name
      disclose age/do not disclose age
      disclose personal details;
      Where an application running on each device can optionally perform point of sale transitions coordinated via the central server, over the WWAN, utilizing user input on each device as confirmation of successive steps in the transition;
      Further, where at least one of the confirmation steps additionally involves displaying an identifying picture related to one of the devices, on the other device;
      Additionally the server performing an authorization for the transition to a third party;
      Or, optionally, a device is interacting with a point of sale device to associate an itemized list of items with a detected second device;
      The service performing a confirmation with the application on the second device requiring user input that the bill of goods list is correct; and/or
      The server storing the information related to the second devices detected account identity and inventory in a database for later use 4. In still other embodiments, a device in the present invention has a wireless capability with no WWAN capability, but only with the ability to broadcast a unique identifier, and
   A central server stores having the broadcast device's details;
   And when the first device provides these detail to the server, authorized and current information about the broadcast device are provided to the first wireless device;

Where this information optionally includes advertising information or information related to "e-coupons" for special offers for products or services; and/or
  Where the content of the e-coupons might be customized based on the identity of the requesting device or account holder;
    Where the content is further customized based on other information known by the server related to the user's account; or
    Where the other information is related to the user's past purchasing practices or previous requests; and/or
A mobile device, upon detecting a broadcast device and if enabled to do so, will report that broadcast Id to the server over a WWAN, and retrieve the current content from the server associated with that device and:
  Display it to the user on their device; or
  Execute instructions associated with the information retrieved from the server.

5. In still further embodiments, a good or service delivery model utilizing the above described broadcast device, is placed in a known location, and further
  a. A mobile device is for detecting the fixed device's identifier via the WPAM/WLAN;
  b. The mobile device reporting this identifier and passing an identifier associated with itself, or the account associated with the user utilizing the device;
  c. The server determining that the detected broadcast device is associated with the broadcast device with a known location;
  d. The server further determining that the identifier is associated with a service, and further associated with an account or that service;
  e. The server retrieving content associated with the service provider's account and providing that content to the application on the requesting mobile device;
  f. Where that content may be a list of items for sale, services for sale, a opinion pole, food menu, or other menu style content which allows for user selection of items, which can be implemented in java code, xml, simple text, or other for example optionally including active code elements;
  g. The application on the mobile device displaying the content to the user display with the itemized list of goods, services, or other selection items;
  h. A user providing selection of one or more of the items, and confirming they wish to purchase said items, and take delivery at or near the location of the fixed broadcast device;
  i. The server facilitating the purchasing of the goods or services from the merchant's account and the customer's account, and providing confirmation to each. Such confirmation including an electronic receipt provided to the customer, for user upon arrival of the deliverer of the good to or service;
  j. The customer confirming receipt of the good or service via the mobile device, thereby completing the transfer of funds and the transition; and/or
  k. The deliverer of the good or service optionally having a mobile device and optionally:
    i. such that identifiers from that device may be detected by the customers device and reported to the server to confirm that the provider's delivery person was present;
    ii. such that the broadcast devices identifier is detected by the delivery person's mobile device and reported to the server confirming the deliver person was in the correct area
    iii. such that the customer's device's transmitted identifier is detected by the delivery persons device and reported to the central server further confirming the physical proximity of the parties involved in the transaction; and/or
    iv. The delivery person confirming the delivery of the good or service to the customer via the user input on their mobile device, and that confirmation being reported to the central server.

6. In another embodiment, a software program is arranged to operate at the application layer on a mobile device, which interfaces to a device driver interface:
  Using wi-fi 802.11 to perform a WLAN local connection protocol; or
  Using Bluetooth to perform the WLAN local connection;
  Where the device driver interface is an NDIS driver or the like;
  Using 1xEVDO, HSDPA, GPRS, EDGE or the like for a wide area WWAN interface;
  The application then providing the reported identifiers to a server, which will make decisions regarding a users interest in these detected identifiers, and policy regard privacy other identifiers;
    The decision process optionally based on priority of the identifier, the class an identifier belongs to, a list the identifier is, or is not included on;
  Based on the result of the action function,
  Sending at least one detected identifier to the network, potentially with additional information from the action function, and retrieving information back from the server related to that identifiers' account information stored on that server;
  The server then receiving a request from a device's application, with a detected identifier
    The server examining both the requesting and the requested identifier's identity and making a policy decision regarding the release of the requested identifiers information related to their account;
    The server in some cases providing a continuously or periodically changing account or device identifier to a specific application on a device to enhance the privacy of the identity of that device;
      The changing of the identifier may be effected by a rule based generation local to the application, or may be downloaded from the server directly; and/or
      The update of the identifier being synchronized to such that it is coordinated with predetermined scanning and broadcasting periods allowing for a known update boundary;

7. In still another embodiment, a method uses the mobile device's time of day derived from the network or other reference for
  synchronizing a PAN/WLAN discovery and advertisement times to save battery life;
  doing the same in a synchronized way among multiple devices;
  while coordinating the timing information utilizing the WWAN and a central server available commonly to the devices, such as by
    Synchronizing identifier transmission timing to save power from WWAN network parameters obtained for the server;

Coordinating any identifier updates to this same timing source; and/or

Using a pool of identifiers available to the central server to assign identifiers to devices changing the identifiers at some time interval derived for the common time reference 8. In another embodiment, A central server uses an identity manager to assign identifiers to devices using a WWAN cellular data link, and wherein identifiers are occasionally changed identifiers are assigned from a pool of identifiers available to the servers;

identifiers are used as 48 bit media access control (MAC) addresses of the short range wireless network adapter identifiers are optionally used as
  an SSID in a IBSS in IEEE-802.11 network beacons
  a BSSID of the IEEE802.11 network adapter;
  in a IEEE802.15.1 Inquiry Response Message as the BD_ADDR
  a device name in a Bluetooth name response packet; or
  listed in a services list as provided in a LMP_features_req message or LMP_features_req_ext message for a Bluetooth device While this invention has been particularly shown and described with references to example embodiments thereof, it will be understood by those skilled in the art that various changes in form and details may be made therein without departing from the scope of the invention encompassed by the appended claims.

What is claimed is:

1. A method for facilitating an exchange of information between first and second wireless devices or entities, the method utilizing a server performing the steps of:
   receiving a first unique identifier communicated over a wide area link from the first wireless device,
   receiving a second unique identifier associated with the second wireless device, the second unique identifier associated with the second wireless device being communicated to the first wireless device over a local wireless link, and then from the first wireless device to the server over the wide area link,
   comparing a disclosure policy associated with the second unique identifier with the first unique identifier from the first wireless device or with an identifier or other data derived from the first unique identifier, wherein the disclosure policy specifies data representing one or more rules for privacy of information concerning the second wireless device or privacy of information concerning an entity associated with the second wireless device; and
   communicating further information to the first wireless device as permitted by a result of comparing the disclosure policy, and wherein said further information is based, at least in part, upon a stored state resulting from previous interactions utilizing said server between the entities associated with the first and second unique identifiers, and wherein said further information additionally comprises content relating to one or more of the following:
   a current step of a multiple step electronic commerce transaction, wherein said current step is related to said stored state and related to feedback ratings by other entities related to an entity associated with the second wireless device,
   a reward for participation in a loyalty program, wherein said reward is dependent upon said stored state and related to past purchasing behavior of an entity associated with the first wireless device, or
   social network content wherein said social network content is dependent upon said stored state, wherein said stored state comprises a friends list associated with the entity associated with the second wireless device, and wherein said disclosure policy utilized in said step of comparing comprises the inclusion of an entity associated with the first wireless device being included in said friends list and resulting in access to the otherwise private social network content of the entity associated with the second wireless device.

2. The method of claim 1 wherein the first unique identifier is associated with a person and the second unique identifier is associated with a business entity.

3. The method of claim 1 wherein at least one of the first or second unique identifiers further comprises one or more of
   a Media Access Control (MAC) address;
   a Bluetooth Device Name;
   a Bluetooth Device Address (BD_ADDR);
   a Service Set Identifier (SSID);
   a Basic Service Set Identifier (BSSID);
   a services list provided in a LMP_features_req message or LMP_features_req ext message;
   an application layer identifier;
   an email address;
   a username; or
   an account number.

4. The method of claim 1 wherein the data in the disclosure policy specifies one or more of the following for an entity or person associated with the second device:
   allow/do not allow notification of local presence;
   disclose personal name/do not disclose personal name;
   disclose age/do not disclose age; or
   do or do not disclose other personal details; or
   do or do not disclose information relating an account associated with the entity or person associated with the first or second unique identifier; or
   do or do not disclose information relating status of a transaction between the entity or person associated with the first and the entity or person associated with the second unique identifier; or
   do not disclose information if the first unique identifier is not authorized; or
   the authorization status of the entity associated with the first unique identifier; or the state of a multiple step process.

5. The method of claim 1 wherein the data in the disclosure policy specifies disclosure of information as a function of the identifier of the first wireless device as a requesting entity.

6. The method of claim 5 wherein the identifier of the requesting entity is classified as one of
   may be disclosed to any requesting entity;
   a requesting entity must provide input;
   approving the disclosure of the information;
   do not disclose information to any other entity; or
   a Information Group Disclosure Policy which may consist of two or more requesting entities on a list of contacts, friends, groups, and characteristics.

7. The method of claim 1 additionally comprising, before the step of receiving a second identifier:
   setting data in the disclosure policy by an entity associated with the second wireless device.

8. The method of claim 7 wherein the data set by the entity associated with the second wireless device specifies one or more of:

they do not wish to receive any unsolicited information;

they do not wish to receive information from a broadcast; or they do wish to receive information from a broadcast device advertising a discount.

9. The method of claim 1 additionally comprising, before the step of communicating further information to the first wireless device:

comparing a second disclosure policy associated with the first unique identifier with the second unique identifier, wherein the second disclosure policy specifies privacy of communication concerning the entity associated with the first wireless device.

10. The method of claim 1 wherein the further information provided to the first wireless device is dependent upon:

a priority of the second wireless device identifier;

a class the second wireless identifier belongs to;

a list the second wireless identifier is included on; and/or a list the second wireless identifier is not included on.

11. The method of claim 1 wherein the further information provided to the first wireless device further comprises at least one of:

a visual identifier of a service or individual;

information about an available service;

an autoplay script;

device capabilities;

a content type field specifying one or more of a picture, a media file, XML/AJAX; or login credentials for a social network; payment information; or instant message credentials; or information relating to an electronic transaction with the entity or person associated with the first or second unique identifiers; or information relating to an order placed by the person or entity associated with the first unique identifier; or a confirmation of a step in the sending of a mobile payment or money transfer to an entity associated with the second wireless device; or a music file; or a video or movie file.

12. The method of claim 1 wherein before the step of the server comparing the disclosure policy associated with second unique identifier, the first wireless device has performed the steps of:

scanning for and receiving unique identifiers associated with two or more wireless devices associated with a merchant entity located in proximity to the first wireless device;

presenting a list of detected merchant unique identifiers to a person associated with the first wireless device; and receiving input from the person indicating a selection of one of the wireless devices in proximity as the second unique identifier; and sending the second unique identifier to the server.

13. The method of claim 1 additionally comprising, before the step of communicating further information to the first wireless device:

receiving a message from the server indicating an entity associated with the second wireless device has performed an action indicating approval of receiving the further information.

14. The method of claim 9 additionally comprising, before the step of communicating further information to the first wireless device:

comparing the disclosure policy associated with the first unique identifier with a second disclosure policy associated with the second unique identifier, to determine that each of the respective communication privacy preferences specifies that communication with a wireless device associated with the other respective unique identifier is permitted.

15. The method of claim 1 additionally comprising:

notifying the first and second wireless devices of common timing reference information specifying active times and non-active times for the steps of receiving the first and second unique identifiers.

16. A server apparatus for facilitating an exchange of information between first and second wireless devices or entities, the server comprising:

a receiver, for receiving a first unique identifier communicated over a wide area network from the first wireless device, and for receiving a second unique identifier associated with the second wireless device, the second unique identifier associated with the second wireless device having been prior communicated to the first wireless device over a local wireless link, and then received from the first wireless device by the server over the wide area network;

a data processor, for locating a disclosure policy associated with the second unique identifier and comparing the disclosure policy to the first unique identifier received from the first wireless device or with an identifier or other data derived from the first unique identifier, wherein the disclosure policy specifies data representing one or more rules for privacy of information concerning the first and second wireless devices; and a transmitter, for communicating further information to the first wireless device as permitted by the disclosure policy, and wherein said further information is based, at least in part, upon a stored state resulting from previous interactions between the entities associated with the first and second unique identifiers, and wherein said further information additionally comprises content relating to one or more of the following:

a current step of a multiple step electronic commerce transaction, wherein said current step is related to said stored state and related to feedback ratings by other entities related to an entity associated with the second wireless device, a reward for participation in a loyalty program, wherein said reward is dependent upon said stored state and related to past purchasing behavior of an entity associated with the first wireless device, or social network content wherein said social network content is dependent upon said stored state, wherein said stored state comprises a friends list associated with the entity associated with the second wireless device, and wherein said disclosure policy utilized in said step of comparing comprises the inclusion of an entity associated with the first wireless device being included in said friends list and resulting in access to the otherwise private social network content of the entity associated with the second wireless device.

17. The apparatus of claim 16 wherein the first unique identifier is associated with a person and the second unique identifier is associated with a business entity.

18. The apparatus of claim 16 wherein at least one of the first or second unique identifiers further comprises one or more of
a Media Access Control (MAC) address;
a Bluetooth Device Name;
a Bluetooth Device Address (BD_ADDR);
a Service Set Identifier (SSID);
a Basic Service Set Identifier (BSSID);
a services list provided in a LMP_features_req message or LMP_features_req ext message;
an application layer identifier;
an email address,
a user name, or
an account number.

19. The apparatus of claim 16 wherein the data in the disclosure policy specifies one or more of the following for an entity or person associated with the second device:
allow/do not allow notification of local presence;
disclose personal name/do not disclose personal name;
disclose age/do not disclose age; or
do or do not disclose other personal details; or
do or do not disclose information relating an account associated with the entity or person associated with the first or second unique identifier; or
do or do not disclose information relating status of a transaction between the entity or person associated with the first and the entity or person associated with the second unique identifier; or
do not disclose information if the first unique identifier is not authorized; or
the authorization status of the entity associated with the first unique identifier; or the state of a multiple step process.

20. The apparatus of claim 16 wherein the data in the disclosure policy specifies disclosure of information as a function of the identifier of the first wireless device as a requesting entity.

21. The apparatus of claim 20 wherein the identifier of the requesting entity is classified as one of
may be disclosed to any requesting entity;
a requesting entity must provide input;
approving the disclosure of the information;
do not disclose information to any other entity; or
a Information Group Disclosure Policy which may consist of two or more requesting entities on a list of contacts, friends, groups, characteristics, circles, or followers.

22. The apparatus of claim 16 wherein the processor:
receives data for the disclosure policy from a person associated with the second wireless device.

23. The apparatus of claim 22 wherein the data from the person associated with the second wireless device specifies one or more of:
they do not wish to receive any unsolicited information;
they do not wish to receive information from a broadcast; or
they do wish to receive information from a broadcast device advertising a discount.

24. The apparatus of claim 16 additionally wherein the processor further compares a second disclosure policy associated with the first unique identifier with the second unique identifier, and wherein the second disclosure policy specifies privacy of communication for the first wireless device.

25. The apparatus of claim 16 wherein the further information provided to the first wireless device is dependent upon:
a priority of the second wireless device identifier;
a class the second wireless identifier belongs to;
a list the second wireless identifier is included on; and/or
a list the second wireless identifier is not included on.

26. The apparatus of claim 16 wherein the further information provided to the first wireless device comprises at least one of:
a visual identifier of a service or individual;
information about an available service;
an autoplay script;
device capabilities;
a content type field specifying one or more of a picture, a media file, XML/AJAX; or
login credentials for a social network; payment information; or instant message credentials; or
information relating to an electronic transaction with the entity or person associated with the first or second unique identifiers; or
information relating to an order placed by the person or entity associated with the first unique identifier; or
a confirmation of a step in the sending of a mobile payment or money transfer to an entity associated with the second wireless device; or
a music file; or
a video or movie file.

27. The apparatus of claim 16 wherein the server receives the first wireless identifier from a first wireless device that further comprises:
a scanner for receiving unique identifiers associated with two or more wireless devices associated with a merchant entity located in proximity to the first wireless device;
a display for presenting a list of detected merchant unique identifiers to a person associated with the first wireless device;
a receiver for receiving input from the person indicating a selection of one of the wireless devices in proximity as the second unique identifier; and
a transmitter for sending the second unique identifier to the server.

28. The apparatus of claim 16 wherein the processor additionally:
receives a message from the first wireless device indicating a person associated with the first wireless device has performed an action indicating approval of receiving the further information.

29. The apparatus of claim 24 wherein the processor further compares, a disclosure policy associated with the first unique identifier with a second disclosure policy associated with the second unique identifier to determine that the each of the respective communication privacy preferences specifies that communication with a wireless device associated with the other respective unique identifier is permitted.

30. The apparatus of claim 16 wherein the transmitter further sends, to the first and second wireless devices, common timing reference information specifying active times and non-active times for the steps of receiving the first and second unique identifiers.

* * * * *